United States Patent
Park

(10) Patent No.: US 12,337,899 B2
(45) Date of Patent: Jun. 24, 2025

(54) REAR LOWER MEMBER AND VEHICLE FRONT STRUCTURE INCLUDING THE SAME

(71) Applicants: Hyundai Motor Company, Seoul (KR); Kia Corporation, Seoul (KR)

(72) Inventor: Ji Woong Park, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 285 days.

(21) Appl. No.: 17/947,416

(22) Filed: Sep. 19, 2022

(65) Prior Publication Data

US 2023/0339546 A1    Oct. 26, 2023

(30) Foreign Application Priority Data

Apr. 21, 2022 (KR) .................. 10-2022-0049647

(51) Int. Cl.
| | |
|---|---|
| *B62D 21/15* | (2006.01) |
| *B62D 25/02* | (2006.01) |
| *B62D 25/04* | (2006.01) |
| *B62D 25/14* | (2006.01) |
| *B62D 25/16* | (2006.01) |
| *B62D 27/06* | (2006.01) |

(52) U.S. Cl.
CPC ......... *B62D 21/152* (2013.01); *B62D 25/025* (2013.01); *B62D 25/04* (2013.01); *B62D 25/145* (2013.01); *B62D 25/16* (2013.01); *B62D 27/065* (2013.01)

(58) Field of Classification Search
CPC ..... B62D 21/152; B62D 25/025; B62D 25/04
See application file for complete search history.

(56) References Cited

U.S. PATENT DOCUMENTS

| | | |
|---|---|---|
| 6,170,906 B1 | 1/2001 | Kasuga |
| 8,424,960 B2 | 4/2013 | Rawlinson et al. |
| 9,776,671 B2 | 10/2017 | Song et al. |
| 2005/0082782 A1 | 4/2005 | Jolley |
| 2015/0298739 A1 | 10/2015 | Buschjohann et al. |
| 2016/0052554 A1* | 2/2016 | Ozawa ................. B62D 21/152 |
| | | 296/187.09 |
| 2017/0015363 A1 | 1/2017 | Song et al. |
| 2017/0203793 A1* | 7/2017 | Nakamura ........... B62D 25/088 |
| 2020/0317272 A1* | 10/2020 | Hong ................... B62D 25/081 |
| 2023/0303182 A1* | 9/2023 | Kim ..................... B62D 25/025 |

FOREIGN PATENT DOCUMENTS

| | | |
|---|---|---|
| JP | 2009298402 A | 12/2009 |
| JP | 2010095031 A | 4/2010 |
| JP | 2017024698 A | 2/2017 |
| KR | 19960022102 A | 7/1996 |
| KR | 100350277 B1 | 8/2002 |
| KR | 20070061628 A | 6/2007 |

* cited by examiner

*Primary Examiner* — Daniel J Colilla
(74) *Attorney, Agent, or Firm* — SLATER MATSIL, LLP

(57) ABSTRACT

According to an embodiment, a vehicle front structure includes a front pillar and a front side member positioned forward of the front pillar and extending in a longitudinal direction of a vehicle. A side sill is connected to a lower end of the front pillar and a rear lower member connected to a rear portion of the front side member, a front portion of the side sill, and a middle portion of the front pillar.

23 Claims, 21 Drawing Sheets

REAR LOWER MEMBER AND VEHICLE FRONT STRUCTURE INCLUDING THE SAME

CROSS-REFERENCE TO RELATED APPLICATIONS

This application claims priority to and the benefit of Korean Patent Application No. 10-2022-0049647 filed in the Korean Intellectual Property Office on Apr. 21, 2022, the entire contents of which are incorporated herein by reference.

TECHNICAL FIELD

The present disclosure relates to a rear lower member and a vehicle front structure including the same.

BACKGROUND

As widely known, a vehicle front structure includes a dash panel configured to separate a front compartment and a passenger compartment, and a pair of front side members disposed forward of the dash panel. The pair of front side members are disposed at a front side of a vehicle and spaced apart from each other in a width direction of the vehicle. A pair of side sills are respectively connected to the pair of front side members by means of a pair of rear lower members. A front portion of each of the side sills is connected to a rear portion of each of the front side members by means of the corresponding rear lower member. A pair of front pillars are respectively connected to two opposite side edges of the dash panel. The front side member, the rear lower member, and the side sill are connected in a longitudinal direction of the vehicle, such that the front side member, the rear lower member, and the side sill limit a load path in the longitudinal direction of the vehicle. The front side member, the rear lower member, and the side sill serve as load transfer members that transfer, in the longitudinal direction of the vehicle, a collision load generated in the event of a collision of the vehicle.

As described above, in the case of the vehicle front structure in the related art, the load path is limited only to the longitudinal direction of the vehicle. For this reason, there is a problem in that a collision load or collision energy cannot be uniformly distributed or transferred in various directions.

Meanwhile, some of the load transfer members may each have an open cross-section, and other load transfer members may each have a closed cross-section. The load transfer member having the open cross-section may have a low cross-sectional secondary moment of force when the loads are applied in various directions. For this reason, the load transfer member having the open cross-section may have lower strength than the load transfer member having the closed cross-section.

In the related art, a process of coupling two or more components by fastening, welding, or the like is required to manufacture the load transfer member having the closed cross-section. Because the process of coupling the two or more components is added, there are problems in that the overall manufacturing process may be complicated, manufacturing costs may increase, and production yield may decrease.

In addition, the load transfer member having the two or more components has low coupling strength at a portion where the two or more components are coupled, which may decrease the overall strength of the load transfer member.

Because the vehicle front structure in the related art uses the load transfer member made by coupling the two or more components as described above, there is a problem in that a collision load or collision energy cannot be easily transferred and distributed.

The above information disclosed in this Background section is only for enhancement of understanding of the background of the invention and therefore it may contain information that does not form the prior art that is already known to a person of ordinary skill in the art.

SUMMARY

Embodiments relate to a rear lower member and a vehicle front structure including the same. Particular relate to a rear lower member, which is capable of improving durability of a vehicle body by securely connecting a front side member, a front pillar, and a side sill, and a vehicle front structure including the same.

Embodiments can provide a vehicle front structure capable of reducing the number of components in comparison with the related art and uniformly distributing and transferring collision loads or collision energy in a vehicle body by providing various load paths extending in various directions.

An exemplary embodiment of the present disclosure provides a vehicle front structure that includes a front pillar, a front side member positioned forward of the front pillar and extending in a longitudinal direction of a vehicle, a side sill connected to a lower end of the front pillar, and a rear lower member connected to a rear portion of the front side member, a front portion of the side sill, and a middle portion of the front pillar. The rear lower member connects the rear portion of the front side member, the front portion of the side sill, and the middle portion of the front pillar, such that the front pillar, the front side member, the rear lower member, and the side sill may define load paths in various directions (a longitudinal direction, a height direction, an inclined direction, and the like) of the vehicle. Therefore, it is possible to uniformly distribute and transfer a collision load or collision energy in various directions.

The rear lower member may be a unitary one-piece structure having one or more closed cross-sections. The rear lower member is configured as a unitary one-piece body having one or more closed cross-sections and manufactured by various casting processes. Therefore, it is possible to reduce manufacturing costs and weight and improve strength and rigidity.

The vehicle front structure according to the exemplary embodiment of the present disclosure may further include a fender apron member extending from the front pillar toward a front side of the vehicle and a fender apron lower member extending in a diagonal direction from the fender apron member to the middle portion of the front pillar. The fender apron lower member extends in the diagonal direction to the middle portion of the front pillar, such that load paths extending in various directions may be implemented.

The front pillar may further include a reinforcing member provided in the front pillar, and a lower end of the fender apron lower member may be fixed to the reinforcing member. The reinforcing member may be aligned with the middle portion of the front pillar. Since the lower end of the fender apron lower member is fixed to the reinforcing member provided in the front pillar as described above, the coupling rigidity between the fender apron lower member and the middle portion of the front pillar may be improved. Further, the load path may be stably defined between the fender apron member, the fender apron lower member, and the front pillar.

The fender apron member, the fender apron lower member, and the front pillar may define a load path having a triangular truss shape. Therefore, the collision load may be variously distributed and transferred in the diagonal direction, the longitudinal direction, and the height direction between the fender apron member, the fender apron lower member, and the front pillar through the load path having a triangular truss shape.

The rear lower member may include an upper closed cross-section extending in a diagonal direction from the front side member to the middle portion of the front pillar and a lower closed cross-section extending from the front side member to the front portion of the side sill. The upper closed cross-section may define the load path extending in the diagonal direction between the rear portion of the front side member and the middle portion of the front pillar, and the lower closed cross-section may define the load path extending between the rear portion of the front side member and the front portion of the side sill, such that the collision load may be uniformly distributed and transferred through the upper closed cross-section and the lower closed cross-section.

The upper closed cross-section may have an upper space defined therein, and one or more upper partition walls may be provided in the upper space. Therefore, the upper partition wall may improve the rigidity and strength of the upper closed cross-section.

The upper partition wall may have an upper through-hole. Therefore, a sand core used for a casting process may pass through the upper through-hole of the upper partition wall. Therefore, the upper closed cross-section may be accurately and easily manufactured. Further, the amount of use of the sand core may be reduced, which makes it possible to reduce manufacturing costs.

The lower closed cross-section may have a lower space defined therein, and one or more lower partition walls may be provided in the lower space. Therefore, the lower partition wall may improve the rigidity and strength of the lower closed cross-section.

The lower partition wall may have a lower through-hole. Therefore, the sand core used for the casting process may pass through the lower through-hole of the lower partition wall. Therefore, the lower closed cross-section may be accurately and easily manufactured. Further, the amount of use of the sand core may be reduced, which makes it possible to reduce manufacturing costs.

The rear lower member may further include a middle-side closed cross-section disposed between the upper closed cross-section and the lower closed cross-section. The middle-side closed cross-section may be interposed between the upper closed cross-section and the lower closed cross-section, thereby improving the rigidity and strength of the rear lower member.

The middle-side closed cross-section may have a middle-side space defined therein, and one or more middle-side partition walls may be provided in the middle-side space. Therefore, the middle-side partition wall may improve the rigidity and strength of the middle-side closed cross-section.

The middle-side partition wall may have a middle-side through-hole. Therefore, the sand core used for the casting process may pass through the middle-side through-hole of the middle-side partition wall. Therefore, the middle-side closed cross-section may be accurately and easily manufactured. Further, the amount of use of the sand core may be reduced, which makes it possible to reduce manufacturing costs.

The upper closed cross-section of the rear lower member, the front pillar, and the lower closed cross-section of the rear lower member may define a load path having a triangular truss shape. Therefore, the collision load may be variously distributed and transferred in the diagonal direction, the longitudinal direction, and the height direction between the upper closed cross-section of the rear lower member, the front pillar, and the lower closed cross-section of the rear lower member through the load path having a triangular truss shape.

The vehicle front structure according to the exemplary embodiment of the present disclosure may further include a dash panel and one or more dash cross members provided on the dash panel, and the one or more dash cross members may be configured to be aligned with at least one of the closed cross-sections of the rear lower member. Since the one or more dash cross members are aligned with at least one of the closed cross-sections of the rear lower member as described above, the load path may be defined in the width direction of the vehicle between the pair of rear lower members respectively connected to the two opposite left and right sides of the dash panel. Therefore, the collision load may be distributed and transferred to the two opposite left and right sides of the vehicle through the one or more dash cross members.

The vehicle front structure according to the exemplary embodiment of the present disclosure may further include a dash panel, an upper dash cross member attached to the dash panel, and a lower dash cross member attached to the dash panel and disposed below the upper dash cross member. The upper dash cross member may be aligned with the middle-side closed cross-section, and the lower dash cross member may be aligned with the lower closed cross-section.

The vehicle front structure according to the exemplary embodiment of the present disclosure may further include a dash panel, an upper dash cross member attached to the dash panel, and a lower dash cross member attached to the dash panel and disposed below the upper dash cross member. The upper dash cross member may be aligned with the upper closed cross-section, and the lower dash cross member may be aligned with the lower closed cross-section.

The vehicle front structure according to the exemplary embodiment of the present disclosure may further include a dash panel and a dash cross member integrated with the dash panel. The dash panel and the dash cross member may be configured as a unitary one-piece structure, and the dash cross member may be aligned with the middle-side closed cross-section and the lower closed cross-section.

The vehicle front structure according to the exemplary embodiment of the present disclosure may further include a dash panel and a dash cross member integrated with the dash panel. The dash panel and the dash cross member may be configured as a unitary one-piece structure, and the dash cross member may be aligned with the upper closed cross-section, the middle-side closed cross-section, and the lower closed cross-section.

The rear lower member may include an exterior surface directed toward the outside of the vehicle and an interior surface directed toward a passenger compartment of the vehicle. The upper closed cross-section and the lower closed cross-section may protrude from the interior surface toward the passenger compartment of the vehicle such that a recessed space is defined between the upper closed cross-section and the lower closed cross-section, and a footrest may be disposed in the recessed space. Therefore, it is possible to improve the spatial utilization of the passenger compartment and improve the strength and rigidity between the upper closed cross-section and the lower closed cross-section.

The rear lower member may include a fitting block protruding from a front portion of the rear lower member toward the front side member, the fitting block may be fitted into the rear portion of the front side member, and an exterior side bolt and an interior side bolt may be mounted in the rear portion of the front side member and the fitting block so as to face each other.

The fitting block may include one or more pipe nuts mounted therein, and the exterior side bolt and the interior side bolt may be screw-coupled to the pipe nut. The exterior side bolt and the interior side bolt may be mounted in the rear portion of the front side member and the fitting block of the rear lower member in a direction in which the exterior side bolt and the interior side bolt face each other. Therefore, fastening forces (mechanical coupling forces) may be applied in opposite directions to the rear portion of the front side member and the fitting block of the rear lower member. Therefore, a robust load transfer structure may be implemented between the rear portion of the front side member and the front portion of the rear lower member.

Another exemplary embodiment of the present disclosure provides a rear lower member including an upper extension portion extending in a diagonal direction and having an upper closed cross-section and a lower extension portion positioned at a lower side of the upper extension portion and having a lower closed cross-section.

The rear lower member may further include a middle-side extension portion interposed between the upper extension portion and the lower extension portion and having a middle-side closed cross-section.

The middle-side extension portion may further include a thin-walled cross-section extending from the middle-side closed cross-section.

According to the present disclosure, the rear lower member having a triangular shape may connect the front side member, the front pillar, and the side sill, such that various load paths may extend in various directions. Therefore, the collision energy or collision load may be uniformly distributed and transferred in various directions.

DETAILED DESCRIPTION OF ILLUSTRATIVE EMBODIMENTS

Figure 1:
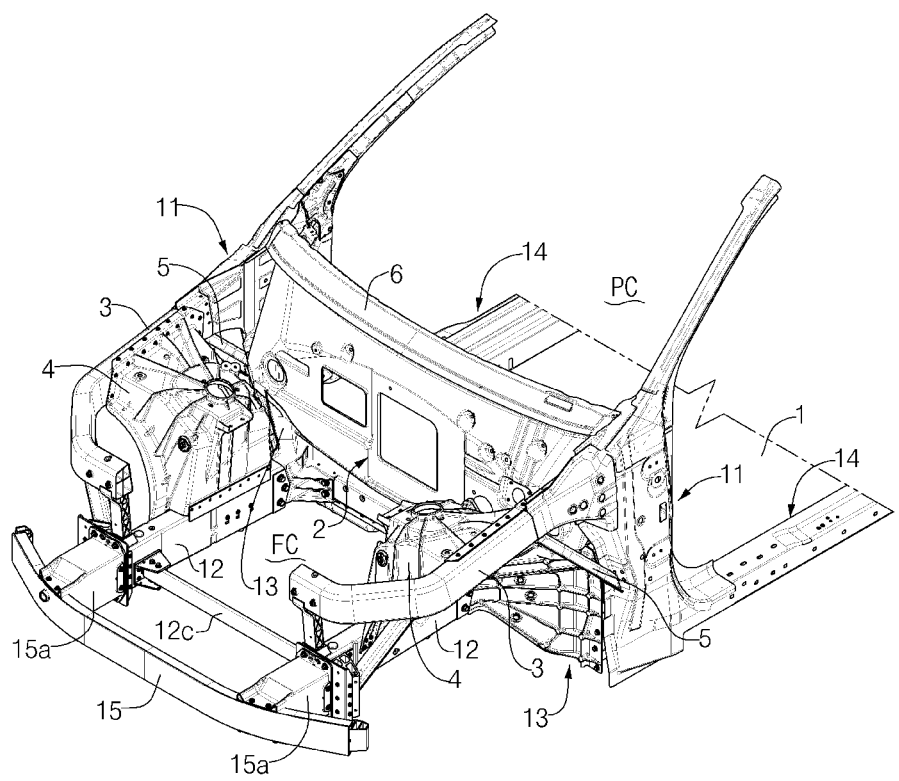
FIG. 1 is a perspective view illustrating a vehicle front structure according to an embodiment of the present disclosure.

Hereinafter, some embodiments of the present disclosure will be described in detail with reference to the illustrative drawings. In giving reference numerals to constituent elements of the respective drawings, it should be noted that the same constituent elements will be designated by the same reference numerals, if possible, even though the constituent elements are illustrated in different drawings. Further, in the following description of the embodiments of the present disclosure, a detailed description of related publicly-known configurations or functions will be omitted when it is determined that the detailed description obscures the understanding of the embodiments of the present disclosure.

In addition, the terms first, second, A, B, (a), and (b) may be used to describe constituent elements of the embodiments of the present disclosure. These terms are used only for the purpose of discriminating one constituent element from another constituent element, and the nature, the sequences, or the orders of the constituent elements are not limited by the terms. Further, unless otherwise defined, all terms used herein, including technical or scientific terms, have the same meaning as commonly understood by those skilled in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present application.

Referring to FIG. 1, a vehicle front structure according to an embodiment of the present disclosure may include a dash panel 2, a pair of front pillars 11 respectively coupled to two opposite side edges of the dash panel 2, a pair of front side members 12 extending toward a front side of a vehicle from the dash panel 2, and a pair of side sills 14 disposed at two opposite side edges of a floor 1. The dash panel 2 may be configured to separate a front compartment FC and a passenger compartment PC. The front compartment may accommodate a powertrain including an electric motor or an internal combustion engine.

A cowl cross 6 may be mounted on an upper edge of the dash panel 2. The cowl cross 6 may extend in a width direction of the vehicle. The pair of front side members 12 may be spaced apart from each other in the width direction of the vehicle. The front side members 12 may each extend in a longitudinal direction of the vehicle. The pair of front side members 12 may be connected to each other in the width direction of the vehicle by means of a cross member 12C. The cross member 12C may extend in the width direction of the vehicle. A front back beam 15 may be connected to front portions of the pair of front side members 12 by means of a pair of crush boxes 15a. The front back beam 15 may extend in the width direction of the vehicle. Therefore, the front back beam 15 may connect the pair of front side members 12 in the width direction of the vehicle.

Figure 2:
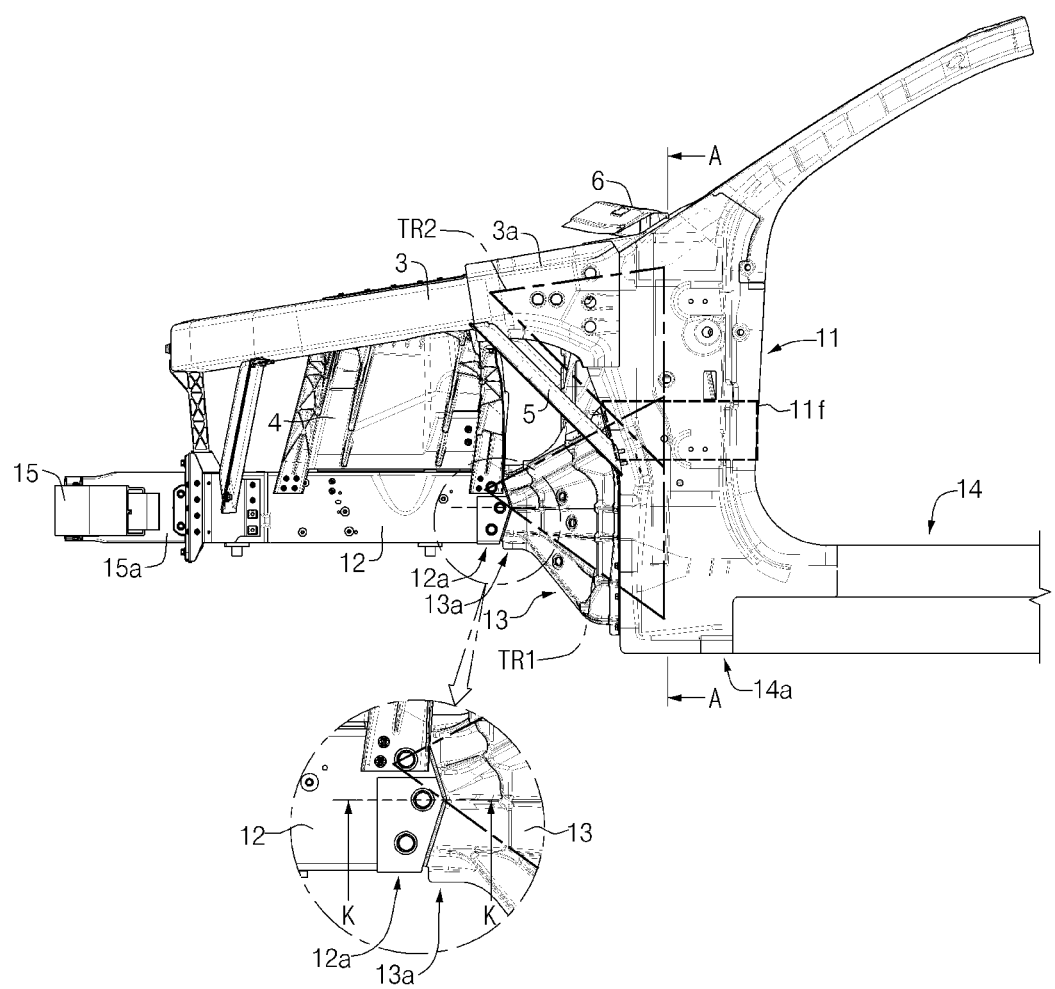
FIG. 2 is a left side view illustrating the vehicle front structure illustrated in FIG. 1.

Referring to FIG. 2, a rear portion of each of the front side members 12 may be connected to a front portion of each of the side sills 14 by means of each of the rear lower members 13. The rear portion 12a of each of the front side members 12 may be coupled to a front portion 13a of each of the rear lower members 13 by fastening, welding, or the like.

Referring to FIG. 1, the pair of front pillars 11 may be respectively coupled to the two opposite side edges of the dash panel 2. The front pillars 11 may each be connected to each of the rear lower members 13 and the front portion of each of the side sills 14. The front pillar 11 may include an interior surface directed toward the passenger compartment PC of the vehicle, and an exterior surface directed toward the outside of the vehicle.

Figure 3:
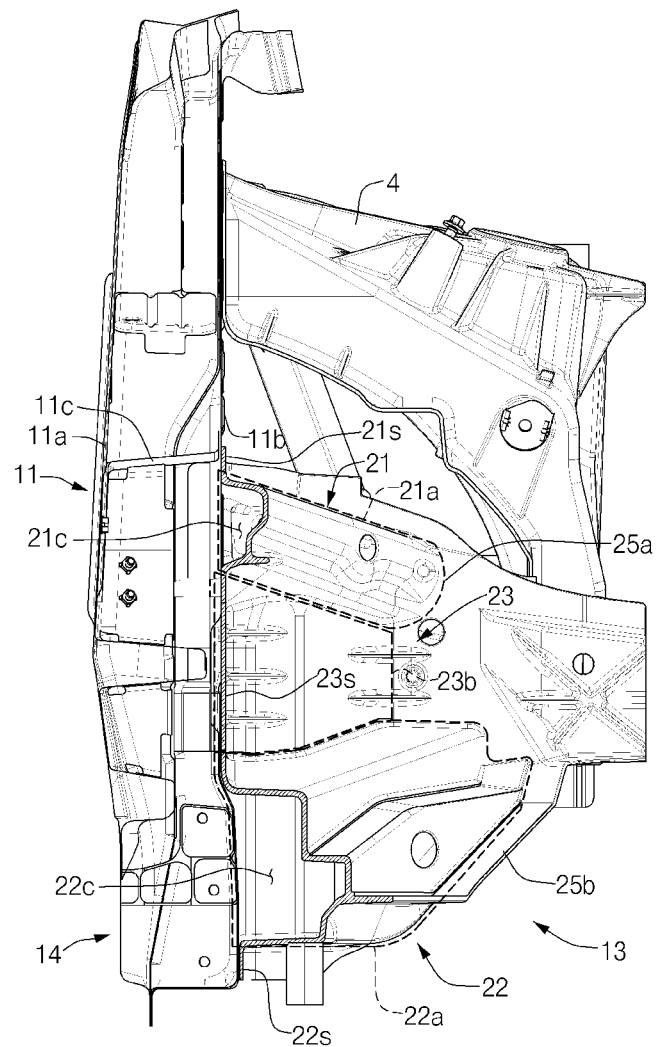
FIG. 3 is a cross-sectional view taken along line A-A in FIG. 2.

Referring to FIG. 3, the front pillar 11 may include a front pillar outer 11a directed toward the outside of the vehicle, and a front pillar inner 11b directed toward the passenger compartment PC of the vehicle. The front pillar outer 11a may have the exterior surface, and the front pillar inner 11b may have the interior surface. A cavity may be provided between the front pillar outer 11a and the front pillar inner 11b. One or more reinforcing members 11c may be disposed in the cavity between the front pillar outer 11a and the front pillar inner part 11b. In particular, the reinforcing member 11c may be aligned with a middle portion 11f of the front pillar 11.

The front pillar 11 may be manufactured by press processing, casting, or the like. For example, the front pillar 11 may be manufactured by press processing using a steel plate. As another example, the front pillar 11 may be manufactured by press processing using an aluminum plate. As still another example, the front pillar 11 may be manufactured by high-vacuum die casting using aluminum. As yet another example, the front pillar 11 may be manufactured by low-pressure casting using aluminum.

Referring to FIG. 1, a pair of fender apron members 3 may be respectively connected to the pair of front pillars 11. The fender apron members 3 may each extend toward the front side of the vehicle from an upper portion of the front pillar 11 corresponding to the fender apron member 3. A rear end of each of the fender apron members 3 may be securely coupled to the corresponding front pillar 11 by means of a reinforcing bracket 3a.

Figure 4:
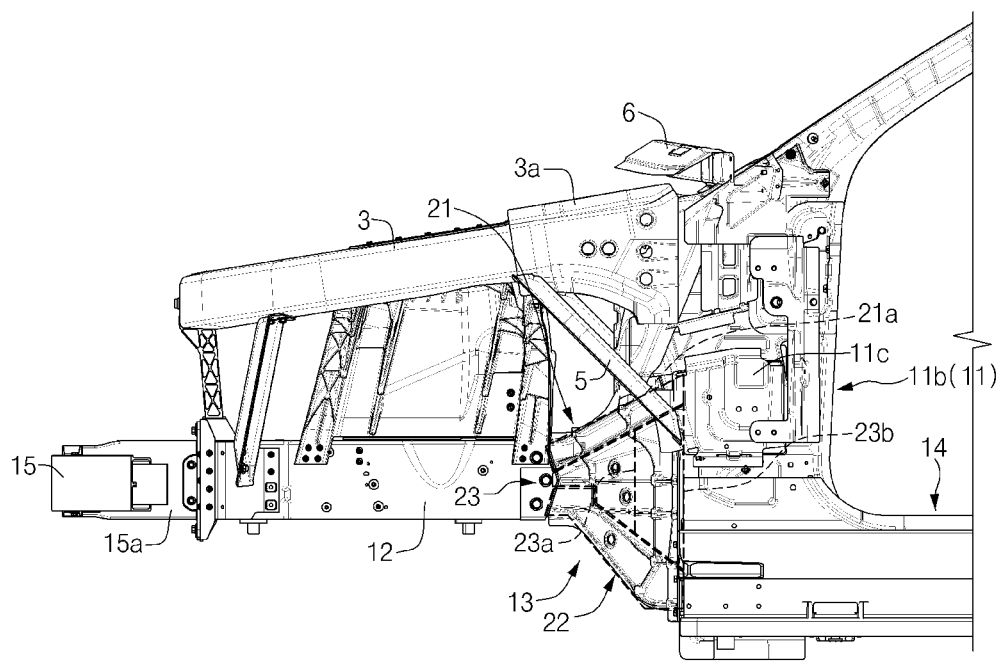
FIG. 4 is a left side view illustrating a state in which a front pillar outer part in FIG. 1 is eliminated.
Figure 5:
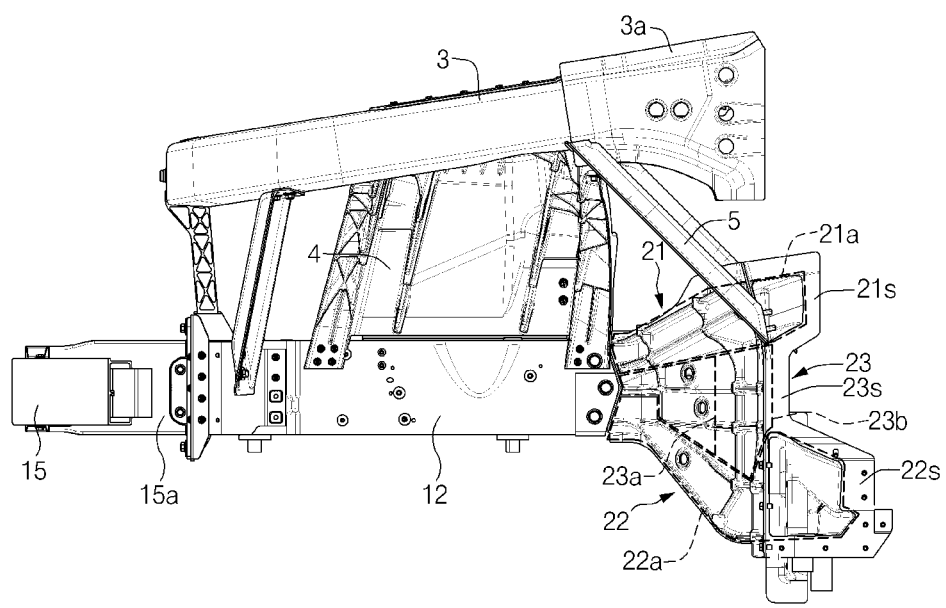
FIG. 5 is a left side view illustrating a state in which a front pillar in FIG. 1 is eliminated.

Referring to FIG. 1, a pair of fender apron lower members 5 may extend from the pair of fender apron members 3 in a diagonal direction. The fender apron lower members 5 may each be configured to connect the corresponding fender apron member 3 and the middle portion 11f of the corresponding front pillar 11 in the diagonal direction. Referring to FIG. 4, an upper end of each of the fender apron lower members 5 may be fixed to the corresponding fender apron member 3 by fastening, welding, or the like. A lower end of each of the fender apron lower members 5 may be fixed to the middle portion 11f of the corresponding front pillar 11 by fastening, welding, or the like. The reinforcing member 11c may be aligned with the middle portion 11f of the front pillar 11.

In particular, the fender apron lower member 5 may penetrate a front wall of the front pillar 11. The lower end of the fender apron lower member 5 may be fixed to the reinforcing member 11c by fastening, welding, or the like. Since the lower end of the fender apron lower member 5 is fixed to the reinforcing member 11c provided in the front pillar 11 as described above, the coupling rigidity between the fender apron lower member 5 and the middle portion 11f of the front pillar 11 may be improved. Further, a load path may be stably defined between the fender apron member 3, the fender apron lower member 5, and the front pillar 11.

Referring to FIG. 1, a pair of damper housings 4 may be respectively connected to the pair of fender apron members 3. The damper housings 4 may each be configured to connect the corresponding fender apron member 3 and the corresponding front side member 12. Specifically, an upper portion of each of the damper housings 4 may be fixed to the corresponding fender apron member 3 by fastening, welding, or the like. A lower portion of each of the damper housings 4 may be fixed to the corresponding front side member 12 by fastening, welding, or the like.

Referring to FIG. 1, the pair of side sills 14 may be disposed at two opposite sides of the vehicle. The side sills 14 may each extend in the longitudinal direction of the vehicle. The front portion of each of the side sills 14 may be attached to a lower portion of the corresponding front pillar 11. According to the embodiment, the side sill 14 may be provided in the form of any one of an aluminum extrusion component, an aluminum die casting component, a structure made by coupling a steel pressing component and a steel pressing reinforcing member, a structure made by coupling a steel pressing component and an aluminum extrusion reinforcing member, and a low-pressure aluminum casting component.

The pair of rear lower members 13 may be symmetrically disposed at the two opposite sides of the dash panel 2. The rear lower members 13 may each be configured to connect the front side member 12, the side sill 14, and the front pillar 11.

Referring to FIG. 1, the front pillars 11, the front side members 12, the rear lower members 13, and the side sills 14 may be structurally connected, thereby constituting the vehicle front structure. The front pillars 11, the front side members 12, the rear lower members 13, and the side sills 14 are connected to one another, such that the front pillars 11, the front side members 12, the rear lower members 13, and the side sills 14 may define load paths in various directions (the longitudinal direction, the height direction, the inclined direction, and the like) of the vehicle. The front pillar 11, the front side member 12, the rear lower member 13, and the side sill 14 serve as load transfer members that transfer a collision load, which is generated in the event of a vehicle collision, in the longitudinal direction of the vehicle.

Figure 9:
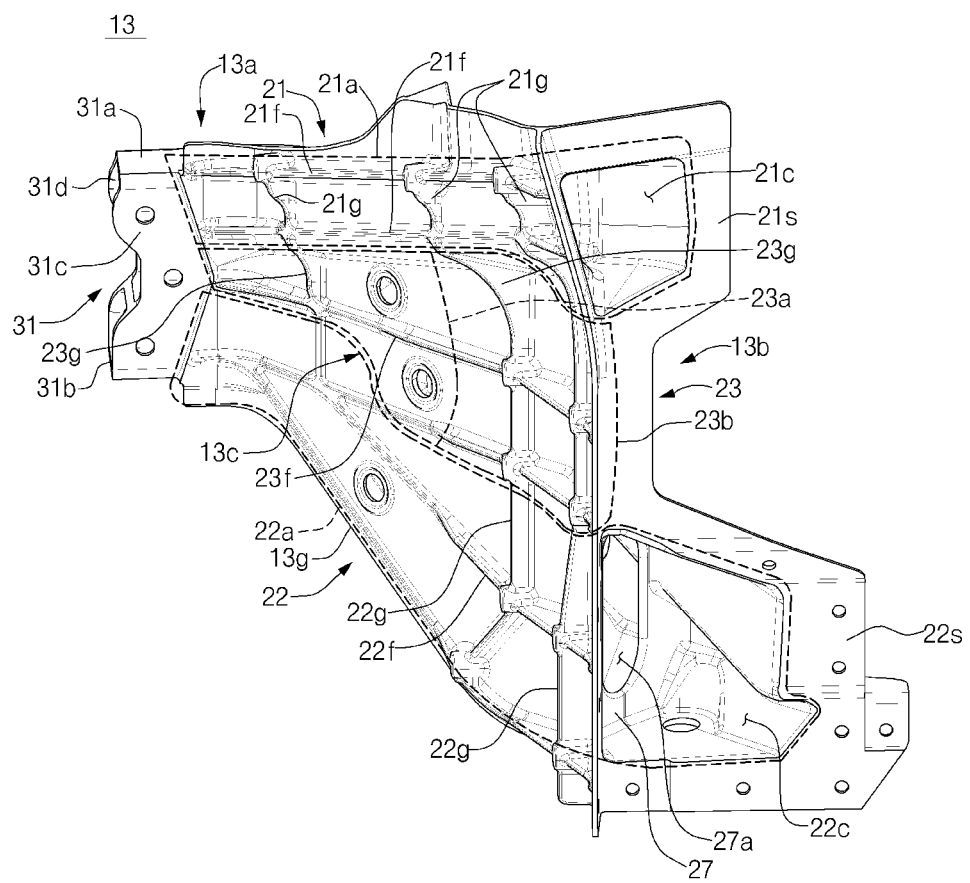
FIG. 9 is a perspective view illustrating a rear lower member according to the embodiment of the present disclosure when viewed from the outside of the vehicle.
Figure 10:
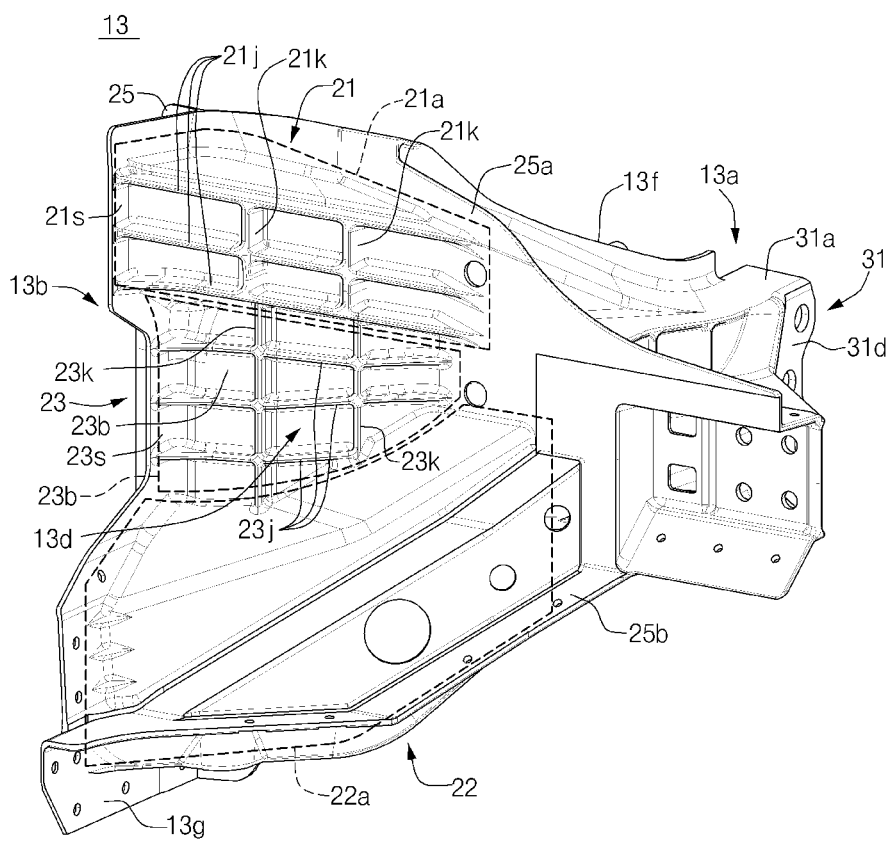
FIG. 10 is a perspective view illustrating the rear lower member according to the embodiment of the present disclosure when viewed in a passenger compartment of a vehicle.
Figure 11:
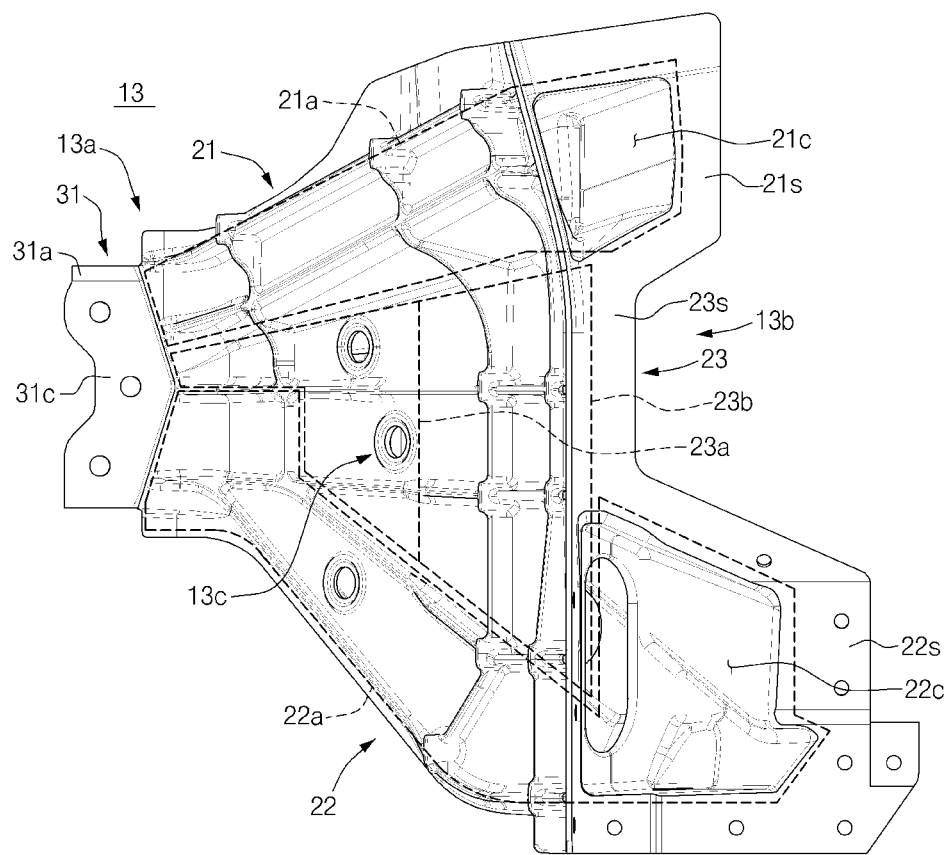
FIG. 11 is a side view illustrating the rear lower member according to the embodiment of the present disclosure.
Figure 12:
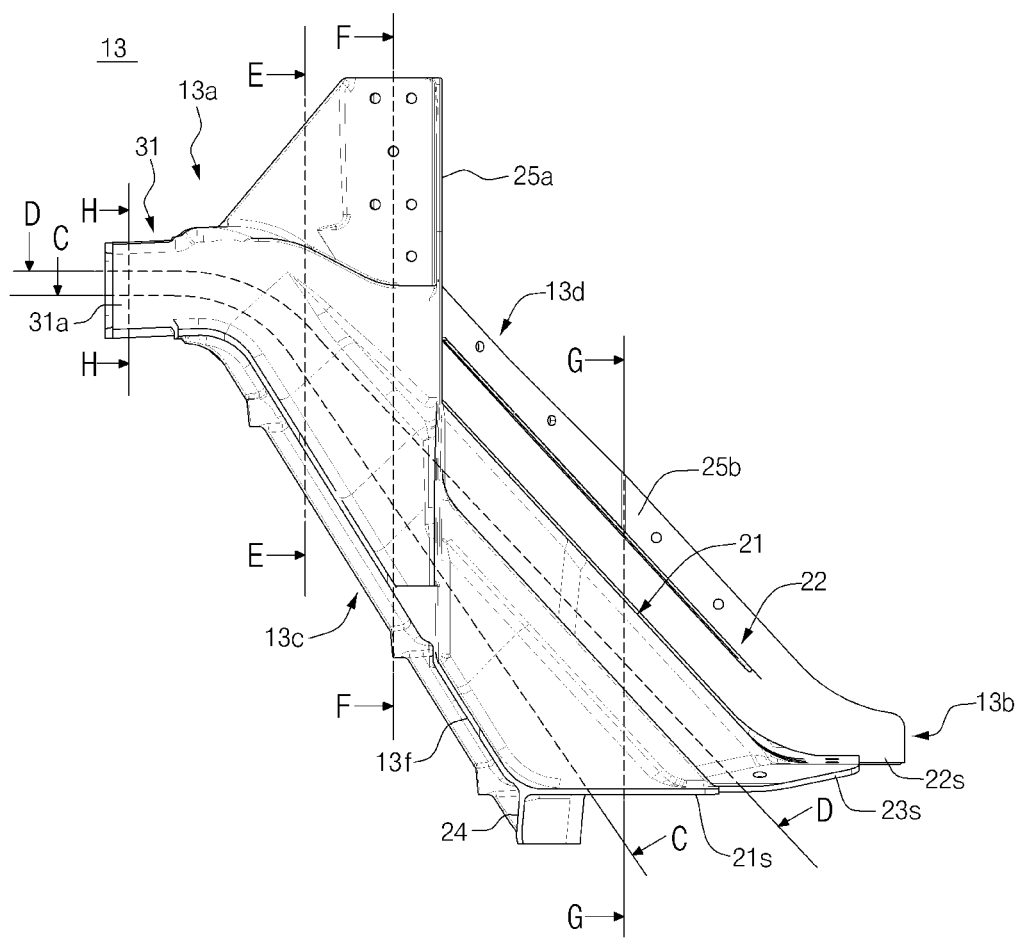
FIG. 12 is a top plan view illustrating the rear lower member according to the embodiment of the present disclosure.

Referring to FIGS. 9 and 10, the rear lower member 13 may include the front portion 13a coupled to the rear portion of the front side member 12, and a rear portion 13b coupled to the front pillar 11 and the side sill 14. The rear lower member 13 may include an exterior surface 13c directed toward the outside of the vehicle, and an interior surface 13*d* directed toward the interior of the vehicle.

Referring to FIG. 2, the rear lower members 13 may each be configured to connect the rear portion 12*a* of each of the front side members 12 to a front portion 14*a* of the corresponding side sill 14 and the middle portion 11*f* of the front pillar 11. As described above, the rear lower member 13 connects the rear portion 12*a* of the front side member 12, the front portion 14*a* of the side sill 14, and the middle portion 11*f* of the front pillar 11, such that the front pillar 11, the front side member 12, the rear lower member 13, and the side sill 14 may define the load paths in various directions (the longitudinal direction, the height direction, the inclined direction, and the like) of the vehicle. Therefore, it is possible to distribute and transfer the collision load or collision energy in various directions.

Referring to FIGS. 4, 9, and 10, the rear lower member 13 may include an upper extension portion 21, a lower extension portion 22 positioned at a lower side of the upper extension portion 21, and a middle-side extension portion 23 positioned between the upper extension portion 21 and the lower extension portion 22.

Referring to FIG. 4, the upper extension portion 21 may extend from the rear portion of the front side member 12 to the middle portion of the corresponding front pillar 11. The middle portion 11*f* of the front pillar 11 may be positioned to be higher than the rear portion 12*a* of the front side member 12. The upper extension portion 21 may extend in the diagonal direction from the rear portion of the front side member 12 to the middle portion of the corresponding front pillar 11 while corresponding to a difference in height between the middle portion 11*f* of the front pillar 11 and the rear portion 12*a* of the front side member 12. In particular, a rear end of the upper extension portion 21 may be aligned with the reinforcing member 11*c* of the front pillar 11. Therefore, the reinforcing member 11*c* of the front pillar 11 may stably support the collision load transferred through the upper extension portion 21. The rear end of the upper extension portion 21, the reinforcing member 11*c*, and the front pillar 11 may be securely connected to one another because the rear end of the upper extension portion 21 and the reinforcing member 11*c* are aligned with the middle portion 11*f* of the front pillar 11.

Referring to FIGS. 9 to 12, a cross-sectional area of the upper extension portion 21 may gradually increase in a direction from the front portion toward the rear portion of the upper extension portion 21. Therefore, the cross-sectional area of the upper extension portion 21 may gradually increase in a direction from the rear portion of the front side member 12 toward the middle portion of the front pillar 11.

Figure 13:
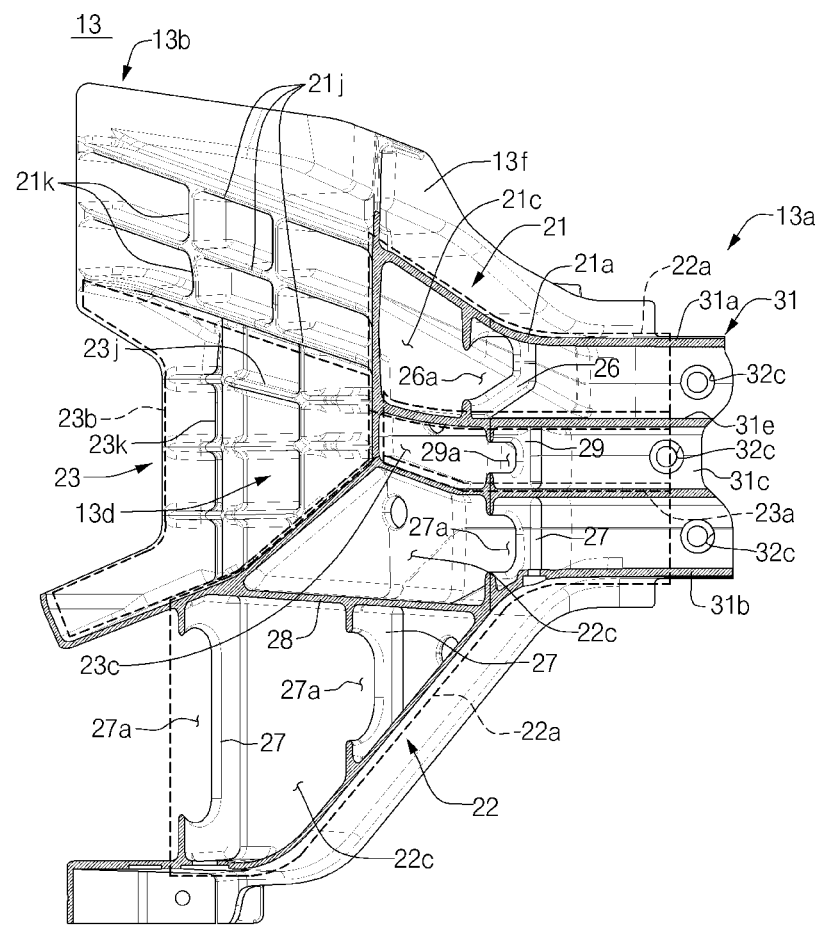
FIG. 13 is a cross-sectional view taken along line C-C in FIG. 12.
Figure 14:
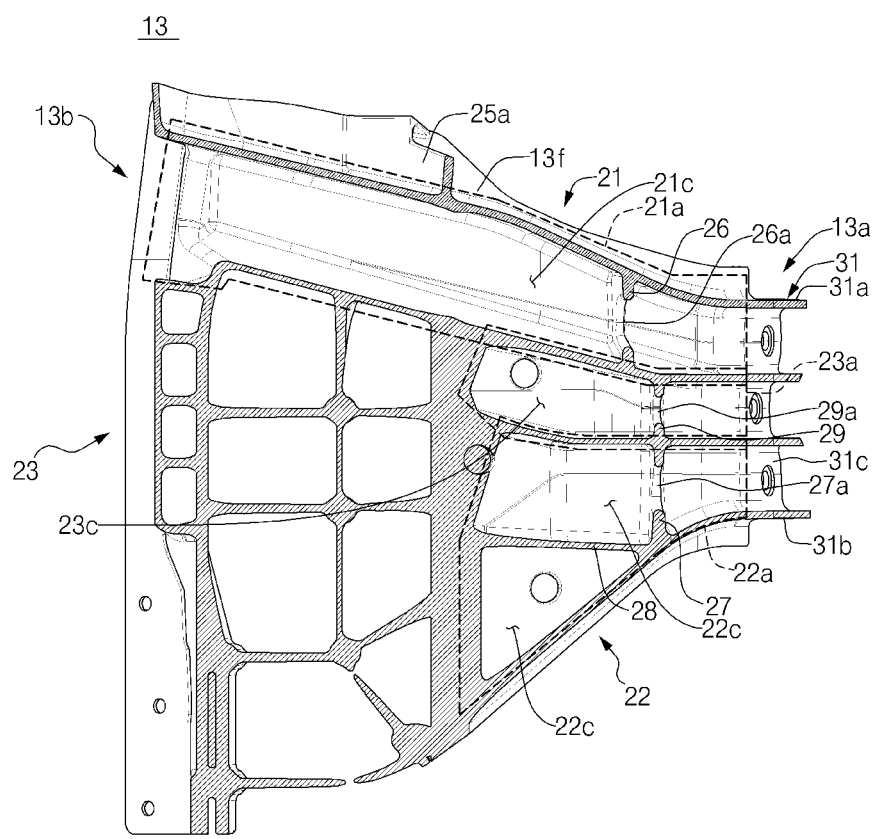
FIG. 14 is a cross-sectional view taken along line D-D in FIG. 12.
Figure 15:
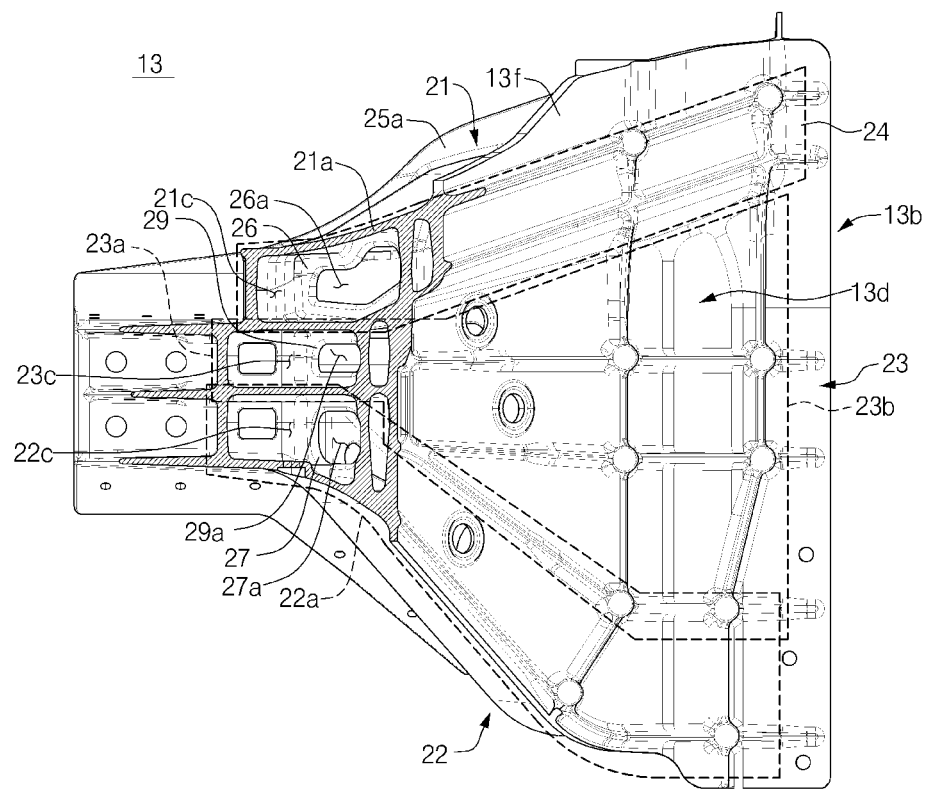
FIG. 15 is a cross-sectional view taken along line E-E in FIG. 12.
Figure 16:
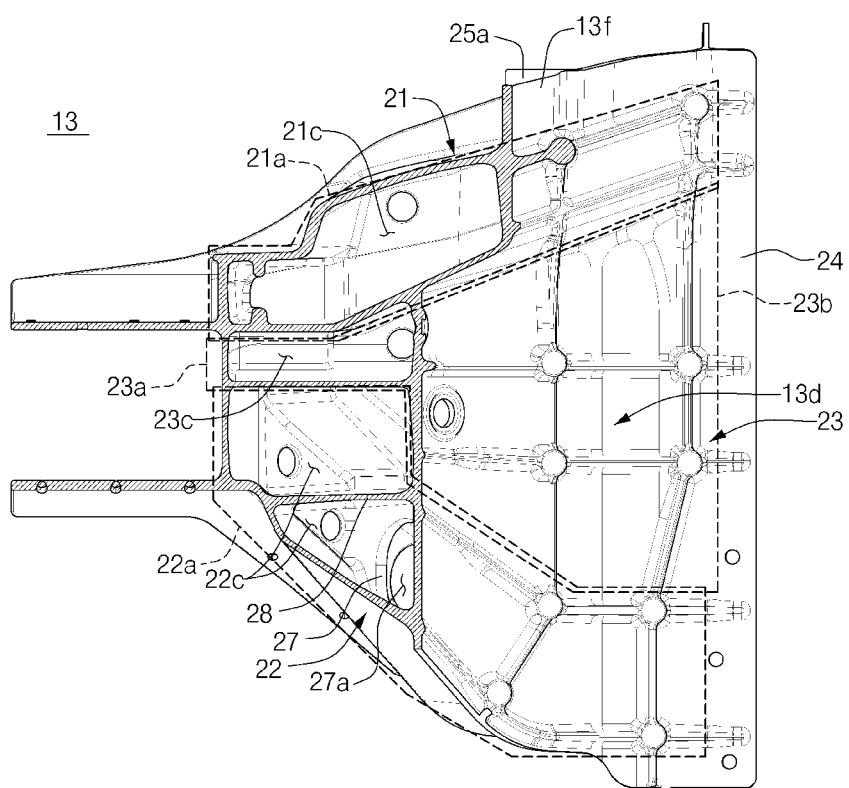
FIG. 16 is a cross-sectional view taken along line F-F in FIG. 12.

Referring to FIGS. 13 to 17, the upper extension portion 21 may have an upper closed cross-section 21*a*. The upper closed cross-section 21*a* may be defined by a plurality of walls. The upper closed cross-section 21*a* may extend in a longitudinal direction of the upper extension portion 21. Therefore, the upper closed cross-section 21*a* may connect the rear portion of the front side member 12 and the middle portion of the front pillar 11 in the diagonal direction. Therefore, the collision load or collision energy transferred to the front side member 12 may be transferred to the middle portion of the front pillar 11 through the upper closed cross-section 21*a*. That is, the upper extension portion 21 and the upper closed cross-section 21*a* may define a load path extending in the diagonal direction between the rear portion of the front side member 12 and the middle portion of the front pillar 11. Referring to FIG. 14, the upper extension portion 21 may have an upper space 21*c* defined in the upper closed cross-section 21*a*, and the upper closed cross-section 21*a* and the upper space 21*c* may extend along an overall length of the upper extension portion 21. Therefore, a length of the upper closed cross-section 21*a* and a length of the upper space 21*c* may be substantially equal to a length of the upper extension portion 21.

Referring to FIGS. 13 to 16, the upper extension portion 21 may further include at least one upper partition wall 26 provided in the upper space 21*c* of the upper closed cross-section 21*a*. The upper partition wall 26 may include a flat surface orthogonal to the longitudinal direction of the upper extension portion 21. The upper partition wall 26 may have an upper through-hole 26*a*. The upper partition wall 26 may be configured to improve the rigidity and strength of the upper extension portion 21 and the upper closed cross-section 21*a*. A sand core used for a casting process may pass through the upper through-hole 26*a* of the upper partition wall 26. Therefore, the upper closed cross-section 21*a* of the upper extension portion 21 may be accurately and easily manufactured. Further, the amount of use of the sand core may be reduced, which makes it possible to reduce manufacturing costs.

Referring to FIG. 4, the lower extension portion 22 may extend from the rear portion of the front side member 12 to the front portion of the corresponding side sill 14. The front portion 14*a* of the side sill 14 may be positioned to be relatively lower than the rear portion 12*a* of the front side member 12. The lower extension portion 22 may extend in the diagonal direction from the rear portion 12*a* of the front side member 12 to the front portion 14*a* of the corresponding side sill 14 while corresponding to a difference in height between the rear portion 12*a* of the front side member 12 and the front portion 14*a* of the side sill 14.

Referring to FIGS. 9 to 12, a cross-sectional area of the lower extension portion 22 may gradually increase in a direction from the front portion toward the rear portion of the lower extension portion 22. Therefore, the cross-sectional area of the lower extension portion 22 may gradually increase in a direction from the rear portion 12*a* of the front side member 12 toward the front portion 14*a* of the side sill 14.

Referring to FIGS. 13 to 17, the lower extension portion 22 may have a lower closed cross-section 22*a*. The lower closed cross-section 22*a* may be defined by a plurality of walls. The lower closed cross-section 22*a* may extend in a longitudinal direction of the lower extension portion 22. Therefore, the lower closed cross-section 22*a* may connect the rear portion of the front side member 12 and the front portion (middle portion) of the side sill 14 in the diagonal direction. Therefore, the collision load or collision energy transferred to the front side member 12 may be transferred to the front portion 14*a* of the side sill 14 through the lower closed cross-section 22*a*. That is, the lower extension portion 22 and the lower closed cross-section 22*a* may define a load path extending in the diagonal direction between the rear portion 12*a* of the front side member 12 and the front portion 14*a* of the side sill 14. Referring to FIGS. 13 and 14, the lower extension portion 22 may have a lower space 22*c* defined in the lower closed cross-section 22*a*, and the lower closed cross-section 22*a* and the lower space 22*c* may extend along an overall length of the lower extension portion 22. Therefore, a length of the lower closed cross-section 22*a* and a length of the lower space 22*c* may be substantially equal to a length of the lower extension portion 22.

Referring to FIGS. 13 to 16, the lower extension portion 22 may further include one or more lower partition walls 27 and 28 provided in the lower space 22*c* of the lower closed cross-section 22*a*. According to the specific embodiment, the first lower partition wall 27 may include a flat surface orthogonal to the longitudinal direction of the upper extension portion 21. The first lower partition wall 27 may have a lower through-hole 27*a*. The second lower partition wall 28 may include a flat surface extending in the longitudinal direction of the lower extension portion 22. The first lower partition wall 27 and the second lower partition wall 28 may be configured to improve the rigidity and strength of the lower extension portion 22 and the lower closed cross-section 22*a*. The sand core used for the casting process may pass through the lower through-hole 27*a* of the first lower partition wall 27. Therefore, the lower closed cross-section 22*a* of the lower extension portion 22 may be accurately and easily manufactured. Further, the amount of use of the sand core may be reduced, which makes it possible to reduce manufacturing costs.

Referring to FIG. 4, the middle-side extension portion 23 may be interposed between the upper extension portion 21 and the lower extension portion 22. The middle-side extension portion 23 may extend from the rear portion of the front side member 12 to the lower portion of the corresponding front pillar 11.

Referring to FIGS. 9 to 12, a height of the middle-side extension portion 23 may gradually increase in a direction from the front portion toward the rear portion of the middle-side extension portion 23. Therefore, the height of the middle-side extension portion 23 may gradually increase in a direction from the rear portion of the front side member 12 toward the lower portion of the front pillar 11. For example, the middle-side extension portion 23 may have a triangular shape.

Referring to FIGS. 13 to 16, the middle-side extension portion 23 may include a middle-side closed cross-section 23*a*, and a thin-walled cross-section 23*b* connected to the middle-side closed cross-section 23*a*. The middle-side closed cross-section 23*a* may be defined by a plurality of walls. The middle-side closed cross-section 23*a* may extend in a longitudinal direction thereof in a front region of the middle-side extension portion 23. The middle-side closed cross-section 23*a* may have an upper common wall that the middle-side closed cross-section 23*a* at least partially shares with the upper closed cross-section 21*a*. The middle-side closed cross-section 23*a* may have a lower common wall that the middle-side closed cross-section 23*a* at least partially shares with the lower closed cross-section 22*a*.

Specifically, an upper wall of the middle-side closed cross-section 23*a* may be the upper common wall that the middle-side closed cross-section 23*a* shares with at least a part a lower wall of the upper closed cross-section 21*a*. A lower wall of the middle-side closed cross-section 23*a* may be the lower common wall that the middle-side closed cross-section 23*a* shares with at least a part of an upper wall of the lower closed cross-section 22*a*. As described above, the middle-side closed cross-section 23*a* may be interposed between the upper closed cross-section 21*a* and the lower closed cross-section 22*a*, thereby improving the rigidity and strength of the rear lower member 13. The thin-walled cross-section 23*b* may extend from a rear edge of the middle-side closed cross-section 23*a* to a rear edge of the middle-side extension portion 23.

The middle-side closed cross-section 23*a* and the intermediate space 23*c* may be provided at the front portion of the middle-side extension portion 23, and the thin-walled cross-section 23*b* may be provided at the rear portion of the middle-side extension portion 23. The middle-side extension portion 23 may have a middle-side space 23*c* defined in the middle-side closed cross-section 23*a*. A length of the middle-side closed cross-section 23*a* and a length of the middle-side space 23*c* may be relatively shorter than an overall length of the middle-side extension portion 23.

Referring to FIGS. 13 to 16, the middle-side extension portion 23 may further include at least one middle-side partition wall 29 provided in the middle-side space 23*c* of the middle-side closed cross-section 23*a*. The middle-side partition wall 29 may include a flat surface orthogonal to a longitudinal direction of the middle-side extension portion 23. The middle-side partition wall 29 may have a middle-side through-hole 29*a*. The middle-side partition wall 29 may be configured to improve the rigidity and strength of the middle-side extension portion 23 and the middle-side closed cross-section 23*a*. The sand core used for the casting process may pass through the middle-side through-hole 29*a* of the middle-side partition wall 29. Therefore, the middle-side closed cross-section 23*a* of the middle-side extension portion 23 may be accurately and easily manufactured. Further, the amount of use of the sand core may be reduced, which makes it possible to reduce manufacturing costs.

Figure 17:
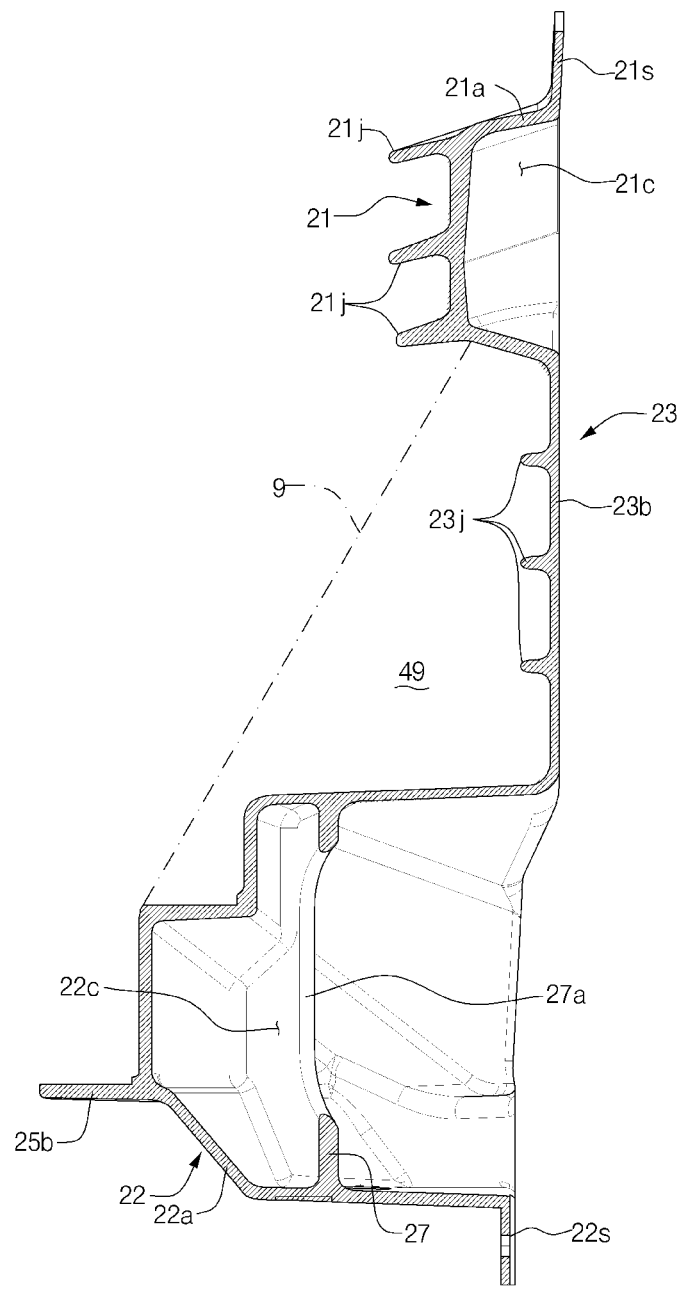
FIG. 17 is a cross-sectional view taken along line G-G in FIG. 12.
Figure 18:
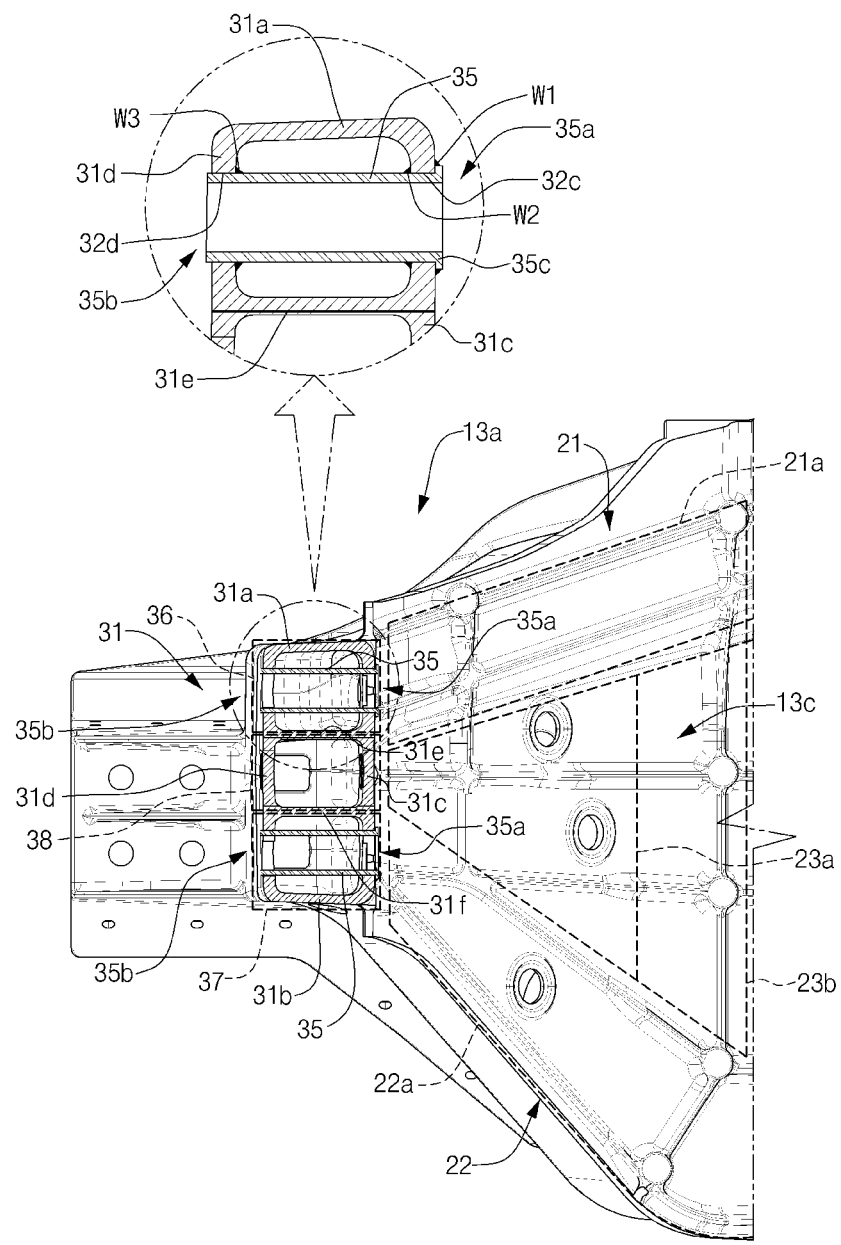
FIG. 18 is a cross-sectional view taken along line H-H in FIG. 12.

Referring to FIG. 17, the thin-walled cross-section 23*b* may be a solid cross-section that does not have a space therein. The upper extension portion 21 and the upper closed cross-section 21*a* may protrude from the thin-walled cross-section 23*b* toward the passenger compartment PC of the vehicle. The lower extension portion 22 and the lower closed cross-section 22*a* may protrude from the thin-walled cross-section 23*b* toward the passenger compartment PC of the vehicle. Therefore, the rear lower member 13 may further include a recessed space 49 disposed in the interior surface 13*d* and defined by the upper extension portion 21, the lower extension portion 22, and the thin-walled cross-section 23*b*. A footrest 9 configured to support a foot of a driver or occupant may be disposed in the recessed space 49. Therefore, it is possible to improve the spatial utilization of the passenger compartment and improve the strength and rigidity between the upper closed cross-section 21*a* and the lower closed cross-section 22*a*.

Referring to FIG. 9, a plurality of exterior ribs 21*f*, 21*g*, 22*f*, 22*g*, 23*f*, and 23*g* may be provided on the exterior surface 13*c* of the rear lower member 13. The plurality of exterior ribs 21*f*, 21*g*, 22*f*, 22*g*, 23*f*, and 23*g* may include a plurality of upper ribs 21*f* and 21*g*, a plurality of lower ribs 22*f* and 22*g*, and a plurality of intermediate ribs 23*f* and 23*g*. The plurality of upper ribs 21*f* and 21*g* may be provided on an upper portion of the exterior surface 13*c* corresponding to the upper extension portion 21. The plurality of upper ribs 21*f* and 21*g* may include an upper longitudinal rib 21*f* extending in the longitudinal direction of the upper extension portion 21, and an upper transverse rib 21*g* configured to intersect the upper longitudinal rib 21*f* at a predetermined angle. The plurality of lower ribs 22*f* and 22*g* may be provided on a lower portion of the exterior surface corresponding to the lower extension portion 22. The plurality of lower ribs 22*f* and 22*g* may include a lower longitudinal rib 22*f* extending in the longitudinal direction of the lower extension portion 22, and a lower transverse rib 22*g* configured to intersect the lower longitudinal rib 22*f* at a predetermined angle. The plurality of intermediate ribs 23*f* and 23*g* may be provided on a middle portion of the exterior surface corresponding to the middle-side extension portion 23. The plurality of intermediate ribs 23*f* and 23*g* may include an intermediate longitudinal rib 23*f* extending in the longitudinal direction of the middle-side extension portion 23, and an intermediate transverse rib 23g configured to intersect the intermediate longitudinal rib 23f at a predetermined angle.

Referring to FIG. 10, a plurality of interior ribs 21j, 21k, 23j, and 23k may be provided on the interior surface 13d of the rear lower member 13. The plurality of interior ribs 21j, 21k, 23j, and 23k may include a plurality of upper ribs 21j and 21k, and a plurality of intermediate ribs 23j and 23k. The plurality of upper ribs 21j and 21k may be provided on an upper portion of the interior surface 13d corresponding to the upper extension portion 21. The plurality of upper ribs 21j and 21k may include an upper longitudinal rib 21j extending in the longitudinal direction of the upper extension portion 21, and an upper transverse rib 21k configured to intersect the upper longitudinal rib 21j at a predetermined angle. The plurality of intermediate ribs 23j and 23k may be provided on a middle portion of the interior surface 13d corresponding to the middle-side extension portion 23. The plurality of intermediate ribs 23j and 23k may include an intermediate longitudinal rib 23j extending in the longitudinal direction of the middle-side extension portion 23, and an intermediate transverse rib 23k configured to intersect the intermediate longitudinal rib 23j at a predetermined angle. In particular, the plurality of intermediate ribs 23j and 23k is provided on the thin-walled cross-section 23b of the middle-side extension portion 23, such that the rigidity and strength of the thin-walled cross-section 23b of the middle-side extension portion 23 may be improved. Therefore, the thin-walled cross-section 23b of the middle-side extension portion 23 may securely support the footrest 9.

According to the embodiment, the rear lower member 13 is manufactured by various casting processing methods such as low-pressure hollow casting (i.e., low-pressure casting or low-pressure die casting), high-pressure die casting, and gravity casting, such that the upper extension portion 21, the lower extension portion 22, the middle-side extension portion 23, the upper closed cross-section 21a, the lower closed cross-section 22a, and the middle-side closed cross-section 23a may constitute a unitary one-piece structure. In particular, the rear lower member 13 has the upper closed cross-section 21a, the lower closed cross-section 22a, and the middle-side closed cross-section 23a. Therefore, it is possible to reduce manufacturing costs and weight and improve strength and rigidity even though the rear lower member 13 is manufactured by low-pressure casting.

Referring to FIGS. 9 and 10, the rear lower member 13 may include an upper edge 13f and a lower edge 13g. Referring to FIGS. 9 to 12, the rear lower member 13 may include an exterior flange 24 and a plurality of interior flanges 25a and 25b. The exterior flange 24 may be fixed to a front surface of the front pillar 11 and a front surface of the side sill 14 by fastening, welding, or the like. The plurality of interior flanges 25a and 25b may be fixed to the dash panel 2 by fastening, welding, or the like. The plurality of interior flanges 25a and 25b may include a first interior flange 25a connected to the upper edge 13f, and a second interior flange 25b connected to the lower edge 13g. The first interior flange 25a may be fixed to an upper dash panel 2a by fastening, welding, or the like. The second interior flange 25b may be fixed to a lower dash panel 2b by fastening, welding, or the like. As described above, the rear lower member 13 may be securely fixed to the dash panel 2 by means of the exterior flange 24 and the plurality of interior flanges 25a and 25b, thereby sufficiently ensuring the structural rigidity between the rear lower member 13 and the dash panel 2.

Referring to FIGS. 9 to 12, the rear lower member 13 may include an upper mounting flange 21s provided at a rear end of the upper extension portion 21, a lower mounting flange 22s provided at a rear end of the lower extension portion 22, and a middle-side mounting flange 23s provided at a rear end of the middle-side extension portion 23. The upper mounting flange 21s may be shaped to surround the upper closed cross-section 21a of the upper extension portion 21. The lower mounting flange 22s may be shaped to surround the lower closed cross-section 22a of the lower extension portion 22. The middle-side mounting flange 23s may extend along the thin-walled cross-section 23b of the middle-side extension portion 23.

Referring to FIG. 3, the upper mounting flange 21s may be fixed to the interior surface of the front pillar 11 by fastening, welding, or the like. The lower mounting flange 22s may be fixed to the interior surface of the side sill 14 by fastening, welding, or the like. The middle-side mounting flange 235 may be fixed to the interior surface of the front pillar 11 and the interior surface of the side sill 14 by fastening, welding, or the like. As described above, the rear lower member 13 may be securely fixed to the front pillar 11 and the side sill 14 by means of the upper mounting flange is, the middle-side mounting flange 23s, and the lower mounting flange 22s, thereby sufficiently ensuring the coupling rigidity between the rear lower member 13, the front pillar 11, and the side sill 14.

Figure 6:
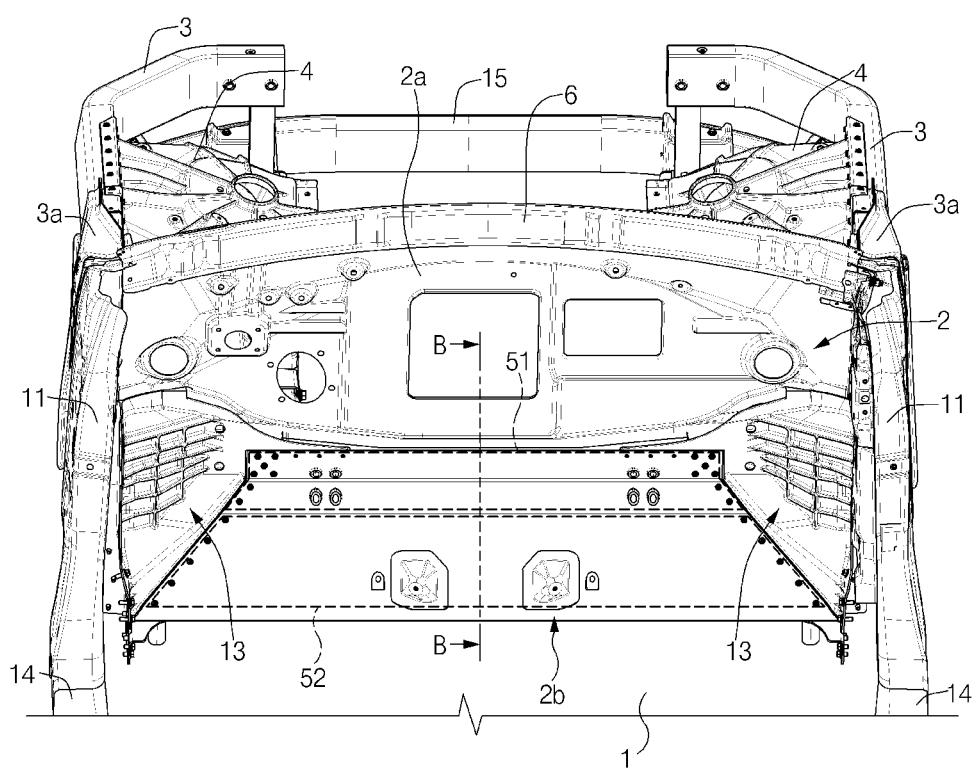
FIG. 6 is a top plan view illustrating the vehicle front structure according to the embodiment of the present disclosure.

Referring to FIG. 6, the pair of rear lower members 13 may be connected to each other in the width direction of the vehicle by means of the dash panel 2. Therefore, the collision load may be transferred in the width direction of the vehicle through the front side member 12, the rear lower member 13, and the dash panel 2. The dash panel 2 may have one or more closed cross-sections 51 and 52 that connect the pair of rear lower members 13 in the width direction of the vehicle. The closed cross-sections 51 and 52 may extend in the width direction of the vehicle. The closed cross-sections 51 and 52 may be defined by one or more dash cross members 17 and 18.

Figure 7A:
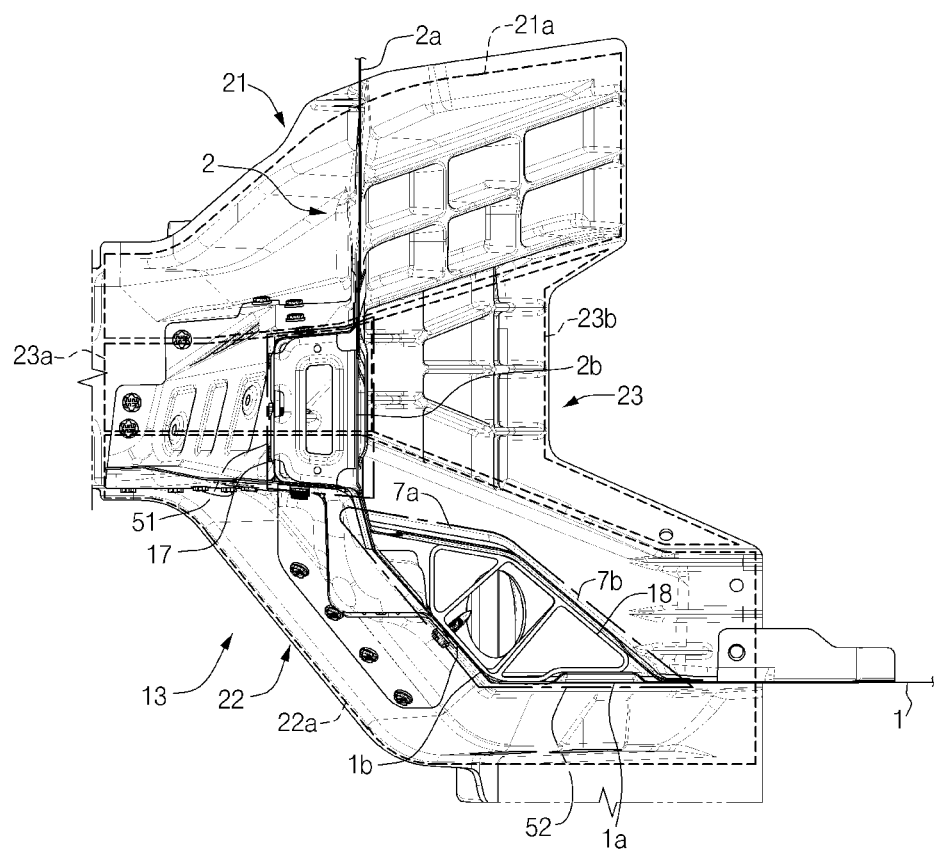
FIG. 7A is a cross-sectional view taken along line B-B in FIG. 6.

Referring to FIG. 7A, the dash panel 2 may include the upper dash panel 2a, and the lower dash panel 2b connected to a lower edge of the upper dash panel 2a. The lower dash panel 2b may include an upper closed cross-section 51, a lower closed cross-section 52 positioned at a lower side of the upper closed cross-section 51. The lower dash panel 2b may include a lower flat portion 7a extending from a lower portion of the lower dash panel 2b toward a rear side of the vehicle, and a lower inclined portion 7b extending from the lower flat portion 7a in the diagonal direction. The floor 1 may include a front flat portion 1a, and a front inclined portion 1b inclined from the front flat portion 1a toward the lower dash panel 2b. The upper dash cross member 17 may be attached to an upper portion of the lower dash panel 2b, thereby defining the upper closed cross-section 51 of the dash panel 2. Specifically, the upper dash cross member 17 may be mounted on a front surface of the lower dash panel 2b, such that the upper dash cross member 17, together with the front surface of the lower dash panel 2b, may define the upper closed cross-section 51 of the dash panel 2. The lower flat portion 7a of the lower dash panel 2b may be parallel to the front flat portion 1a of the floor 1. The lower inclined portion 7b of the lower dash panel 2b may be parallel to the front inclined portion 1b of the floor 1. The lower dash cross member 18 may be attached to a lower portion of the lower dash panel 2b, thereby defining the lower closed cross-section 52 of the dash panel 2. The lower flat portion 7a and the lower inclined portion 7b of the lower dash panel 2b are mounted on the front flat portion 1*a* and the front inclined portion 1*b* of the floor 1, such that the lower flat portion 7*a* and the lower inclined portion 7*b* of the lower dash panel 2*b*, together with the lower dash cross member 18 and the front flat portion 1*a* and the front inclined portion 1*b* of the floor 1, may define the lower closed cross-section 52 of the dash panel 2.

Referring to FIG. 7A, the upper dash cross member 17 may be positioned adjacent to the lower flat portion 7*a* of the lower dash panel 2*b*. The upper dash cross member 17 and the upper closed cross-section 51 of the dash panel 2 may be aligned with the middle-side closed cross-section 23*a* of the middle-side extension portion 23. The lower dash cross member 18 and the lower closed cross-section 52 of the dash panel 2 may be aligned with the lower closed cross-section 22*a* of the lower extension portion 22.

Figure 7B:
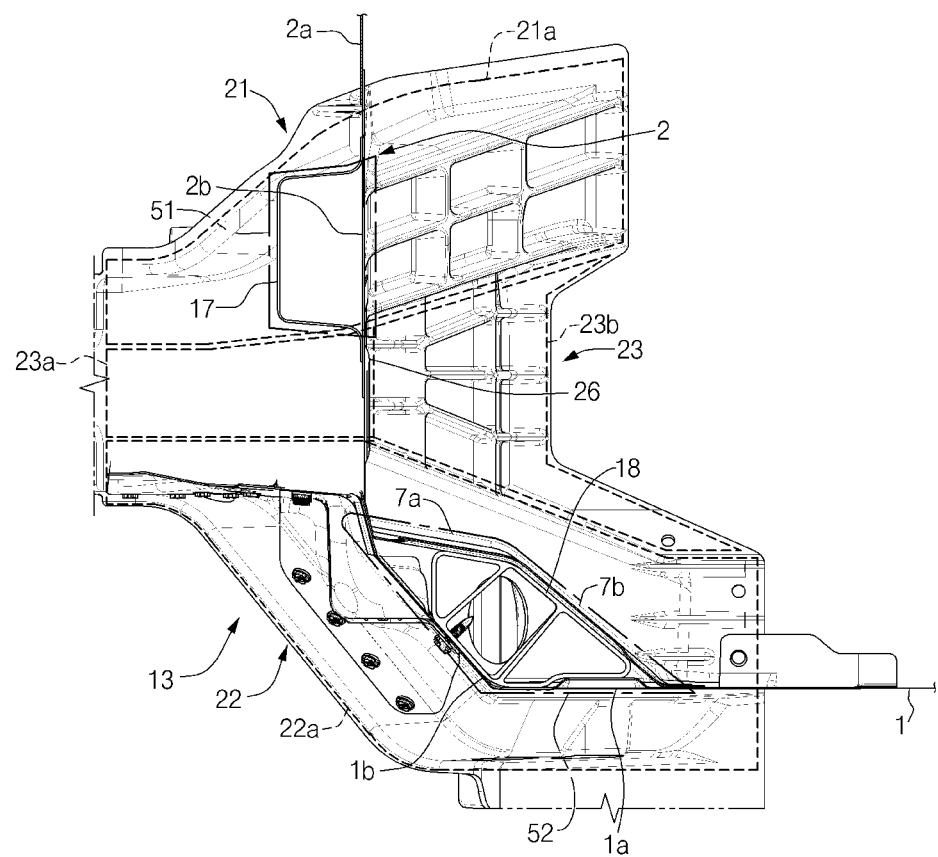
FIG. 7B is a view illustrating a modified embodiment of FIG. 7A.

According to another embodiment, as illustrated in FIG. 7B, the upper dash cross member 17 may be positioned on the upper portion of the lower dash panel 2*b*. The upper dash cross member 17 and the upper closed cross-section 51 of the dash panel 2 may be aligned with the upper closed cross-section 21*a* of the upper extension portion 21. The lower dash cross member 18 and the lower closed cross-section 52 of the dash panel 2 may be aligned with the lower closed cross-section 22*a* of the lower extension portion 22.

Figure 8A:
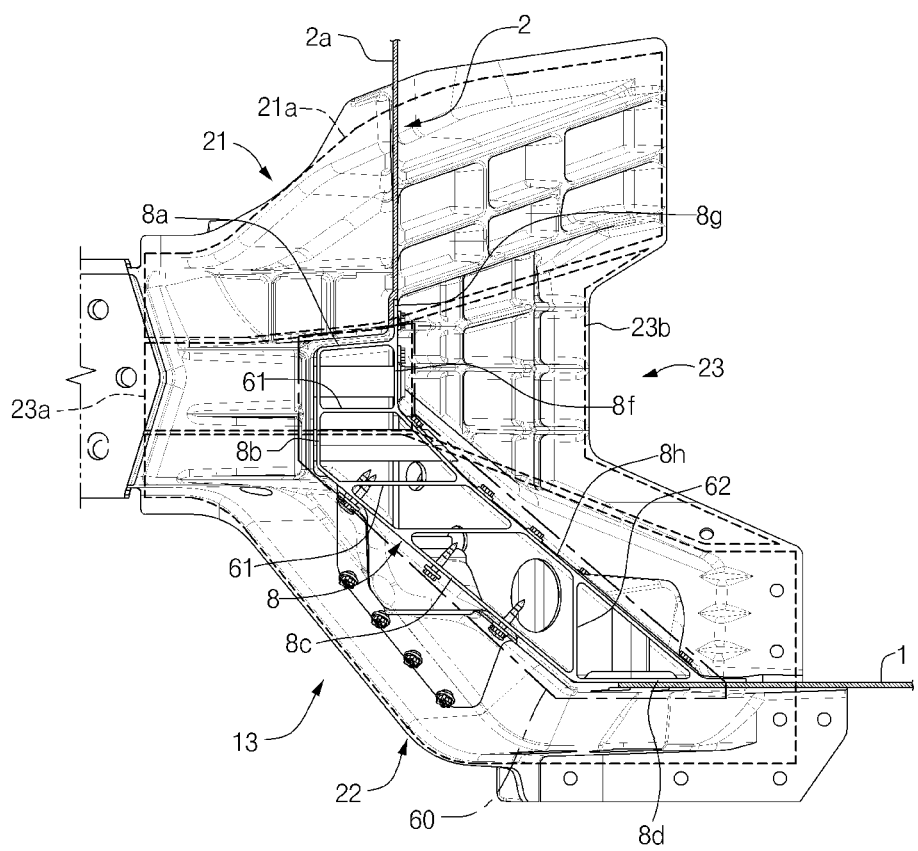
FIG. 8A is a view illustrating a modified embodiment of FIG. 7A.

FIG. 8A is a cross-sectional view illustrating the dash panel 2 according to another embodiment.

Referring to FIG. 8A, the dash panel 2 may include the upper dash panel 2*a*. A dash cross member 8 may be connected to a lower portion of the dash panel 2. Specifically, the dash cross member 8 may be connected to a lower edge of the upper dash panel 2*a*. The dash cross member 8 may have a closed cross-section 60 defined by a plurality of walls. The closed cross-section 60 may be aligned with the middle-side extension portion 23 and the lower extension portion 22 of the rear lower member 13. Specifically, the dash cross member 8 may include an upper wall 8*a*, a front wall 8*b* extending vertically from a front edge of the upper wall 8*a*, a front inclined wall 8*c* inclined downward from the front wall 8*b*, a bottom wall 8*d* extending horizontally from a lower edge of the front inclined wall 8*c* toward the rear side of the vehicle, a rear wall 8*f* extending vertically from a rear edge of the upper wall 8*a*, and a rear inclined wall 8*h* inclined downward from the rear wall 8*f* toward a rear edge of the bottom wall 8*d*.

In addition, the dash cross member 8 may include an upper flange 8*g* extending vertically from the rear wall 8*f*. The upper flange 8*g* may be fixed to a lower edge of the upper dash panel 2*a* by fastening, welding, or the like. The upper flange 8*g* of the dash cross member 8 is fixed to the lower edge of the upper dash panel 2*a*, such that the rear wall 8*f* of the dash cross member 8 may be vertically aligned with the upper dash panel 2*a* of the dash panel 2. Therefore, the rear wall 8*f* and the rear inclined wall 8*h* of the dash cross member 8 may serve as the lower dash panel 2*b* illustrated in FIGS. 7 and 7B. A plurality of partition walls 61 and 62 is provided in an internal space of the dash cross member 8, such that the internal space of the closed cross-section 60 may be divided by the plurality of partition walls 61 and 62.

Figure 8B:
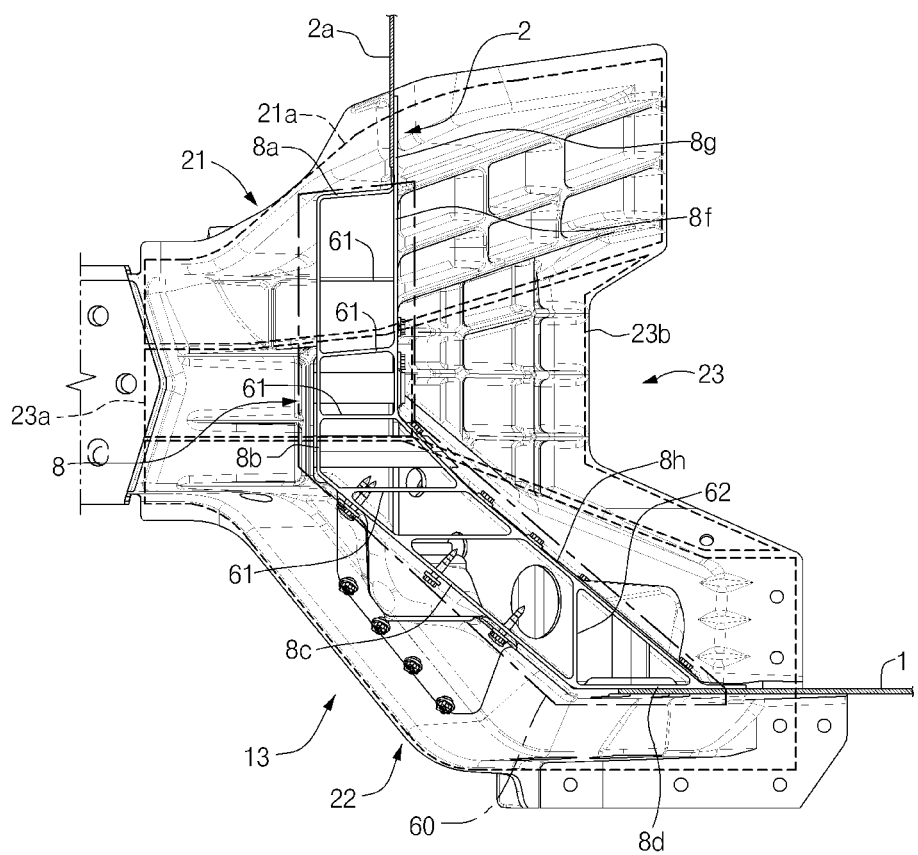
FIG. 8B is a view illustrating a modified embodiment of FIG. 8A.

According to another embodiment, as illustrated in FIG. 8B, the upper wall 8*a*, the front wall 8*b*, and the rear wall 8*f* of the dash cross member 8 may extend upward. Therefore, the closed cross-section 60 of the dash cross member 8 may be entirely aligned with the upper closed cross-section 21*a* of the upper extension portion 21, the middle-side closed cross-section 23*a* of the middle-side extension portion 23, and the lower closed cross-section 22*a* of the lower extension portion 22 of the rear lower member 13.

Referring to FIG. 2, the upper closed cross-section 21*a* of the upper extension portion 21, the lower closed cross-section 22*a*, and the front pillar 11 may define a load path TR1 having a triangular truss shape. Therefore, the collision load may be variously distributed and transferred in the diagonal direction, the longitudinal direction, and the height direction between the upper closed cross-section 21*a* of the rear lower member 13, the front pillar 11, and the lower closed cross-section 22*a* of the rear lower member 13 through the load path TR1 having a triangular truss shape.

Referring to FIG. 2, the fender apron member 3, the fender apron lower member 5, and the front pillar 11 may define a load path TR2 having a triangular truss shape. Therefore, the collision load may be variously distributed and transferred in the diagonal direction, the longitudinal direction, and the height direction between the fender apron member 3, the fender apron lower member 5, and the front pillar 11 through the load path TR2 having a triangular truss shape.

As described above, the two load paths TR1 and TR2 each having a triangular truss shape are provided in the vehicle front structure by the rear lower member 13 and the fender apron lower member 5, such that the load paths may be defined in various directions. Therefore, the collision load transferred to the front side member 12 and the rear lower member 13 may be transferred to the fender apron member 3 through the front pillar 11, thereby distributing and transferring the collision load in various directions.

Referring to FIGS. 9 to 12, the rear lower member 13 may further include a fitting block 31 protruding from the front portion 13*a*. The fitting block 31 may include an upper wall 31*a* directed toward a top side of the vehicle, a bottom wall 31*b* directed toward a bottom side of the vehicle, an exterior wall 31*c* directed toward the outside of the vehicle, an interior wall 31*d* directed toward the interior of the vehicle, and two partition walls 31*e* and 31*f* provided in an internal space of the fitting block 31.

The fitting block 31 may include an upper closed cross-section 36 connected to the upper closed cross-section 21*a*, a lower closed cross-section 37 connected to the lower closed cross-section 22*a*, and a middle-side closed cross-section 38 connected to the middle-side closed cross-section 23*a*. The upper closed cross-section 36 may be defined by the upper wall 31*a*, the exterior wall 31*c*, the interior wall 31*d*, and the upper partition wall 31*e*. The lower closed cross-section 37 may be defined by the bottom wall 31*b*, the exterior wall 31*c*, the interior wall 31*d*, and the lower partition wall 31*f*. The middle-side closed cross-section 38 may be defined by the upper partition wall 31*e*, the exterior wall 31*c*, the interior wall 31*d*, and the lower partition wall 31*f*.

The fitting block 31 may have a plurality of through-holes 32*c* and 32*d*, and pipe nuts 35 may be mounted in the plurality of through-holes 32*c* and 32*d* by welding w1, w2, and w3. The exterior side through-holes 32*c* may be provided in the exterior wall 31*c*, and the interior side through-holes 32*d* may be provided in the interior wall 31*d*. A central axis of the exterior side through-hole 32*c* may be aligned with a central axis of the interior side through-hole 32*d*. The pipe nut 35 may be fitted into the exterior side through-hole 32*c* and the interior side through-hole 32*d*. An internal thread portion may be formed on an inner peripheral surface of the pipe nut 35. The pipe nut 35 may include a first end 35a fixed to the exterior wall 31c by welding w1 and w2, and a second end 35b fixed to the interior wall 31d by welding w3.

A part of the first end 35a may protrude from the exterior wall 31c toward the outside of the vehicle. An outer peripheral surface of the protruding portion of the first end 35a may be fixed to the exterior wall 31c by all-around welding w1. An outer peripheral surface of the first end 35a positioned in the internal space of the fitting block 31 may be fixed to the exterior wall 31c by partial welding w2 performed on the outer peripheral surface of the first end 35a at about 160°. The pipe nut 35 may have a head portion 35c provided at the first end 35a. The head portion 35c may prevent the pipe nut 35 from separating from the through-holes 32c and 32d of the fitting block 31. An outer peripheral surface of the second end 35b positioned in the internal space of the fitting block 31 may be fixed to the interior wall 31d by partial welding w3 performed on the outer peripheral surface of the second end 35b at about 160°. According to the embodiment, the welding w1, w2, and w3 may be performed by MIG welding.

Figure 19:
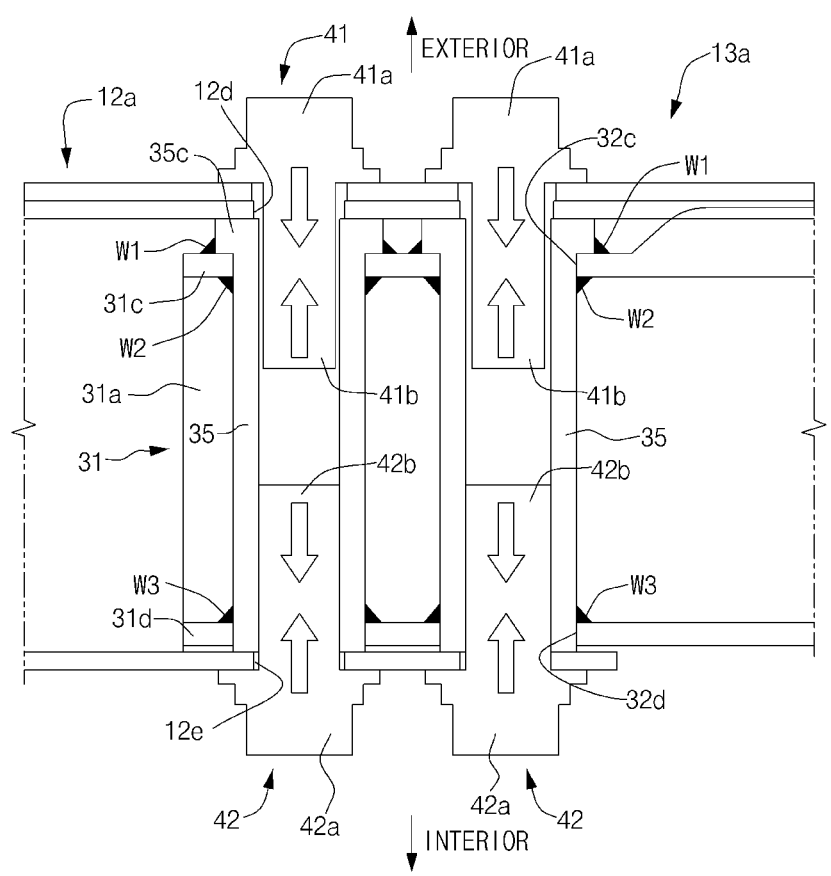
FIG. 19 is a cross-sectional view taken along line K-K in FIG. 2.

Referring to FIG. 19, the fitting block 31 may be configured to be fitted into an internal space of the rear portion 12a of the front side member 12. Specifically, the fitting block 31 may be press-fitted into the internal space of the rear portion 12a of the front side member 12. The front side member 12 may have an exterior wall directed toward the outside of the vehicle, and an interior wall directed toward the interior of the vehicle. In addition, the rear portion 12a of the front side member 12 may have an exterior side through-hole 12d provided in the exterior wall, and an interior side through-hole 12e provided in the interior wall. A central axis of the exterior side through-hole 12d may be aligned with a central axis of the interior side through-hole 12e. Therefore, the exterior side through-hole 12d and the interior side through-hole 12e of the front side member 12 may be aligned with the exterior side through-hole 32c and the interior side through-hole 32d of the fitting block 31.

Referring to FIG. 19, exterior side bolts 41 may fasten the exterior wall of the rear portion 12a of the front side member 12 and the exterior wall 31c of the fitting block 31. The exterior side bolt 41 may include a head portion 41a, and a threaded portion 41b extending from the head portion 41a. The threaded portion 41b of the exterior side bolt 41 may be screw-coupled to the internal thread portion of the pipe nut 35.

Referring to FIG. 19, interior side bolts 42 may fasten the interior wall of the rear portion 12a of the front side member 12 and the interior wall 31d of the fitting block 31. The interior side bolt 42 may include a head portion 42a, a threaded portion 42b extending from the head portion 42a. The threaded portion 42b of the interior side bolt 42 may be screw-coupled to the internal thread portion of the pipe nut 35.

As described above, the exterior side bolt 41 and the interior side bolt 42 may fasten the rear portion 12a of the front side member 12 and the fitting block 31 of the rear lower member 13 in a direction in which the exterior side bolt 41 and the interior side bolt 42 face each other. Therefore, fastening forces (mechanical coupling forces) may be applied in opposite directions to the rear portion 12a of the front side member 12 and the fitting block 31 of the rear lower member 13 (see the directions indicated by the arrows in FIG. 19). Therefore, a robust load transfer structure may be implemented between the rear portion 12a of the front side member 12 and the front portion 13a of the rear lower member 13.

The above description is simply given for illustratively describing the technical spirit of the present disclosure, and those skilled in the art to which the present disclosure pertains will appreciate that various changes and modifications are possible without departing from the essential characteristic of the present disclosure.

Therefore, the embodiments disclosed in the present disclosure are provided for illustrative purposes only but not intended to limit the technical spirit of the present disclosure. The scope of the technical spirit of the present disclosure is not limited thereby. The protective scope of the present disclosure should be construed based on the following claims, and all the technical spirit in the equivalent scope thereto should be construed as falling within the scope of the present disclosure.

What is claimed is:

1. A vehicle front structure, comprising:
   a front pillar;
   a front side member positioned forward of the front pillar and extending in a longitudinal direction of a vehicle;
   a side sill connected to a lower end of the front pillar; and
   a rear lower member connected to a rear portion of the front side member, a front portion of the side sill, and a middle portion of the front pillar,
   wherein:
      the rear lower member comprises an upper closed cross-section extending in a diagonal direction from the front side member to the middle portion of the front pillar,
      the upper closed cross-section has an upper space defined therein,
      an upper partition wall disposed in the upper space, and
      the upper partition wall has an upper through-hole.

2. The vehicle front structure of claim 1, wherein the rear lower member is a unitary one-piece structure having one or more closed cross-sections.

3. The vehicle front structure of claim 1, further comprising:
   a fender apron member extending from the front pillar toward a front side of the vehicle; and
   a fender apron lower member extending in a diagonal direction from the fender apron member to the middle portion of the front pillar.

4. The vehicle front structure of claim 3, wherein the front pillar further comprises:
   a reinforcing member provided in the front pillar; and
   a lower end of the fender apron lower member is fixed to the reinforcing member.

5. The vehicle front structure of claim 4, wherein the reinforcing member is aligned with the middle portion of the front pillar.

6. The vehicle front structure of claim 3, wherein the fender apron member, the fender apron lower member, and the front pillar define a load path having a triangular truss shape.

7. The vehicle front structure of claim 1, wherein the rear lower member further comprises:
   a lower closed cross-section extending from the front side member to the front portion of the side sill.

8. The vehicle front structure of claim 7, wherein:
   the lower closed cross-section has a lower space defined therein; and
   the vehicle front structure further comprises a lower partition wall disposed in the lower space.

9. The vehicle front structure of claim 8, wherein the lower partition wall has a lower through-hole.

10. The vehicle front structure of claim 7, wherein the upper closed cross-section of the rear lower member, the front pillar, and the lower closed cross-section of the rear lower member define a load path having a triangular truss shape.

11. The vehicle front structure of claim 7, wherein the rear lower member further comprises a middle-side closed cross-section disposed between the upper closed cross-section and the lower closed cross-section.

12. The vehicle front structure of claim 11, wherein:
the middle-side closed cross-section has a middle-side space defined therein; and
the vehicle front structure further comprises a middle-side partition wall disposed in the middle-side space.

13. The vehicle front structure of claim 12, wherein the middle-side partition wall has a middle-side through-hole.

14. The vehicle front structure of claim 11, further comprising:
a dash panel; and
one or more dash cross members provided on the dash panel,
wherein the one or more dash cross members are configured to be aligned with at least one of the closed cross-sections of the rear lower member.

15. The vehicle front structure of claim 11, further comprising:
a dash panel;
an upper dash cross member attached to the dash panel, wherein the upper dash cross member is aligned with the middle-side closed cross-section; and
a lower dash cross member attached to the dash panel and disposed below the upper dash cross member, wherein the lower dash cross member is aligned with the lower closed cross-section.

16. The vehicle front structure of claim 11, further comprising:
a dash panel;
an upper dash cross member attached to the dash panel, wherein the upper dash cross member is aligned with the upper closed cross-section; and
a lower dash cross member attached to the dash panel and disposed below the upper dash cross member, wherein the lower dash cross member is aligned with the lower closed cross-section.

17. The vehicle front structure of claim 11, further comprising:
a dash panel; and
a dash cross member connected to a lower portion of the dash panel,
wherein the dash cross member is aligned with the middle-side closed cross-section and the lower closed cross-section.

18. The vehicle front structure of claim 11, further comprising:
a dash panel; and
a dash cross member connected to a lower portion of the dash panel,
wherein the dash cross member is aligned with the upper closed cross-section, the middle-side closed cross-section, and the lower closed cross-section.

19. The vehicle front structure of claim 7, wherein the rear lower member comprises:
an exterior surface directed toward an outside of the vehicle; and
an interior surface directed toward a passenger compartment of the vehicle,
wherein:
the upper closed cross-section and the lower closed cross-section protrude from the interior surface toward the passenger compartment of the vehicle such that a recessed space is defined between the upper closed cross-section and the lower closed cross-section, and
a footrest is disposed in the recessed space.

20. The vehicle front structure of claim 1, wherein:
the rear lower member comprises a fitting block protruding from a front portion of the rear lower member toward the front side member,
the fitting block is fitted into the rear portion of the front side member, and
an exterior side bolt and an interior side bolt are mounted in the rear portion of the front side member and the fitting block so as to face each other.

21. The vehicle front structure of claim 20, wherein:
the fitting block comprises one or more pipe nuts mounted therein, and
the exterior side bolt and the interior side bolt are screw-coupled to the pipe nut.

22. A vehicle front structure comprising:
a dash panel;
a front pillar coupled to a side edge of the dash panel;
a front side member positioned forward of the front pillar and extending in a longitudinal direction of a vehicle;
a side sill connected to a lower end of the front pillar;
a rear lower member connected to a rear portion of the front side member, a front portion of the side sill, and a middle portion of the front pillar; and
one or more dash cross members provided on the dash panel,
wherein:
the rear lower member comprises:
an upper closed cross-section extending in a diagonal direction from the front side member to the middle portion of the front pillar;
a lower closed cross-section extending from the front side member to the front portion of the side sill; and
a middle-side closed cross-section disposed between the upper closed cross-section and the lower closed cross-section, and
the one or more dash cross members are configured to be aligned with at least one of the closed cross-sections of the rear lower member.

23. A vehicle front structure, comprising:
a front pillar;
a front side member positioned forward of the front pillar and extending in a longitudinal direction of a vehicle;
a side sill connected to a lower end of the front pillar; and
a rear lower member connected to a rear portion of the front side member, a front portion of the side sill, and a middle portion of the front pillar,
wherein:
the rear lower member comprises a fitting block protruding from a front portion of the rear lower member toward the front side member,
the fitting block is fitted into the rear portion of the front side member, and
an exterior side bolt and an interior side bolt are mounted in the rear portion of the front side member and the fitting block so as to face each other.

* * * * *